United States Patent
Jain et al.

(10) Patent No.: US 11,842,140 B2
(45) Date of Patent: *Dec. 12, 2023

(54) CONSTRUCTING A PATH FOR CHARACTER GLYPHS

(71) Applicant: Adobe Inc., San Jose, CA (US)

(72) Inventors: Arushi Jain, San Jose, CA (US); Vijit Saxena, San Jose, CA (US); Praveen Kumar Dhanuka, San Jose, CA (US); Matthew Fisher, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,542

(22) Filed: Mar. 31, 2022

(65) Prior Publication Data
US 2022/0222420 A1 Jul. 14, 2022

Related U.S. Application Data

(63) Continuation of application No. 16/892,795, filed on Jun. 4, 2020, now Pat. No. 11,314,924.

(51) Int. Cl.
*G06F 40/109* (2020.01)
*G06F 40/166* (2020.01)
*G06F 40/126* (2020.01)
*G06V 30/414* (2022.01)
*G06V 30/40* (2022.01)

(52) U.S. Cl.
CPC .......... *G06F 40/109* (2020.01); *G06F 40/126* (2020.01); *G06F 40/166* (2020.01); *G06V 30/414* (2022.01); *G06V 30/43* (2022.01)

(58) Field of Classification Search
CPC .... G06F 40/109; G06F 40/126; G06F 40/166; G06V 30/414; G06V 30/43; G06V 30/222
See application file for complete search history.

(56) References Cited

U.S. PATENT DOCUMENTS

| 6,512,522 B1 | 1/2003 | Miller et al. |
| 7,752,543 B2 | 7/2010 | Gerhard et al. |
| 8,026,923 B1 | 9/2011 | Gupta |

(Continued)

OTHER PUBLICATIONS

U.S. Appl. No. 16/892,795, "First Action Interview Office Action Summary", dated Jul. 6, 2021, 4 pages.

(Continued)

*Primary Examiner* — Keith D Bloomquist
(74) *Attorney, Agent, or Firm* — Kilpatrick Townsend & Stockton LLP

(57) ABSTRACT

Techniques described herein take character glyphs as input and generate a text-on-a-path text object that includes the character glyphs arranged in a determined order along a path. For instance, a method described herein includes accessing character glyphs in input data. The method further includes determining an order for the character glyphs based on relative positions and orientations of the character glyphs in the input data. The method further includes generating a path for the character glyphs, based on the order, and associating the path with the character glyphs. Further, the method includes generating a text object that includes the set of character glyphs arranged in the order along the path.

20 Claims, 20 Drawing Sheets

(56) References Cited

U.S. PATENT DOCUMENTS

| | | |
|---|---|---|
| 8,584,012 B1 | 11/2013 | Orhanskiy et al. |
| 9,405,735 B1 | 8/2016 | Adamson, III |
| 10,019,415 B1 | 7/2018 | Wombell |
| 2008/0238927 A1* | 10/2008 | Mansfield ............... G06T 11/60 345/467 |
| 2013/0304604 A1* | 11/2013 | Hoffman ............ G06Q 30/0621 705/26.5 |
| 2015/0007021 A1 | 1/2015 | Antipa |
| 2015/0261300 A1* | 9/2015 | Masuko ............... G06F 3/0482 345/156 |
| 2017/0337902 A1 | 11/2017 | Nicholl et al. |
| 2018/0253878 A1 | 9/2018 | Jain et al. |
| 2020/0098086 A1 | 3/2020 | Peterson |

OTHER PUBLICATIONS

U.S. Appl. No. 16/892,795 , "First Action Interview Pilot Program Pre-Interview Communication", dated Mar. 16, 2021, 4 pages.
U.S. Appl. No. 16/892,795 , "Notice of Allowance", dated Dec. 13, 2021, 6 pages.

* cited by examiner

Lorem ipsum dolor sit amet, consectetur adipiscing elit, Utquam magna at 710, 710a
220
220
220
710, 710b

FIG. 7

CONSTRUCTING A PATH FOR CHARACTER GLYPHS

CROSS-REFERENCE TO RELATED APPLICATION

This application is a continuation of U.S. patent application Ser. No. 16/892,795, titled "Constructing a Path for Character Glyphs," filed Jun. 4, 2020, now allowed, the contents of which are incorporated herein by reference in their entirety.

TECHNICAL FIELD

This disclosure generally relates to processing and editing of text whose layout follows a particular path. More specifically, but not by way of limitation, this disclosure relates to techniques for processing a set of character glyphs to construct a path for the set of character glyphs and, further, creating a text object based on the set of character glyphs in which the path information is associated the set of character glyphs, such that the text object can be edited or otherwise manipulated in a manner that uses the determined path information.

BACKGROUND

Some image-editing and text-editing applications enable a user to create and format text such that the text flows along the edge of a closed or open-ended path. This text is sometimes referred to as type-on-a-path text. For example, a user may specify a path and then type characters of a text segment such that the characters follow the specified path. Alternatively, a user may select certain text and format it to follow a certain path. A path can be open or closed and can take various shapes, including slanted lines, curves, loops, or sharp corners, and as result, portions of the text can follow curves and loops or whatever shape the user selects for the path. Text typed on a path is common in logo design, for instance.

There are several situations when path information associated with a piece of text is lost. This happens, for example, when the type-on-a-path text is created using one application and then opened in another application. For instance, when text typed on a path is exported from its native application and imported into a second application, the second application may not have access to path information that defined how the text was arranged in the native application. As another example, the path information can be lost when the format of a document containing the type-on-a-path text is changed to a format that cannot understand or process the path information, such as when the document is printed and then scanned into a scan format. Further, if optical character recognition (OCR) is applied by an OCR system to scanned text to recognize characters, the OCR system is not able to recover the path information. When OCR is used to recognize characters in a document, the document is scanned from top to bottom in horizontal scan lines. However, text that is typed on a nonlinear path is not readable in horizontal scan lines due to varying positions and orientations of the characters. As a result, the OCR system recognizes individual characters of the type-on-a-path text as individual text pieces rather than recognizing that the characters are part of a combined, contiguous block of text that follows a path. Often, the order of the characters in the text is also lost.

When path information for the text is lost, such as in the above scenarios, a user is no longer able to manipulate or otherwise edit the text as desired. For instance, because each character in the text is now stored as its own text piece with a fixed orientation matching the orientation of that character, editing the character or the text causes an undesirable result. For example, if a character is oriented at a forty-five degree angle, the OCR system assumes the character to be part of a straight line of text at that same angle, rather than part of a curved path that potentially includes other characters with varying orientations. As a result, when the user edits the text at the position of that character, any edits are applied in a straight line to an individual text piece including that character, rather than on a path along which the text is supposed to flow.

SUMMARY

Techniques described herein take character glyphs as input and generate a text-on-a-path text object that includes the character glyphs arranged in a determined order along a path. In some embodiments, a method described herein performed by a type-on-a-path (TOP) construction system includes accessing character glyphs in input data. In one example, a computing system inputs the character glyphs from a document, where the document has been output by an optical character recognition (OCR) system. The character glyphs are input in an arbitrary order corresponding to the sequence in which the OCR system scanned the character glyphs. The method further includes determining, by an ordering subsystem of the TOP construction system, a logical order for the character glyphs based on relative positions and orientations of the character glyphs in the input data. For instance, the computing system uses a cost function to assign a cost to each ordered pair selected from the character glyphs and, based on the costs of the ordered pairs, determines a logical order for the character glyphs based on minimizing a total cost of ordering the character glyphs. The method further includes generating, by a path-fitting subsystem of the TOP construction system, a path for the character glyphs, based on the order. The method further includes associating, by the path-fitting subsystem, the path with the character glyphs. For instance, the computing system determines a respective curve to connect the character glyphs in each adjacent pair of character glyphs in the logical order, and the computing system combines the various curves into a path. The method further includes generating, by an object-generation subsystem of the TOP construction system, a text object that includes the set of character glyphs associated with the path and arranged in the logical order along the path.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 7 shows an example of character glyphs that could be arranged in clusters, according to some embodiments described herein.

DETAILED DESCRIPTION

Figure 1:
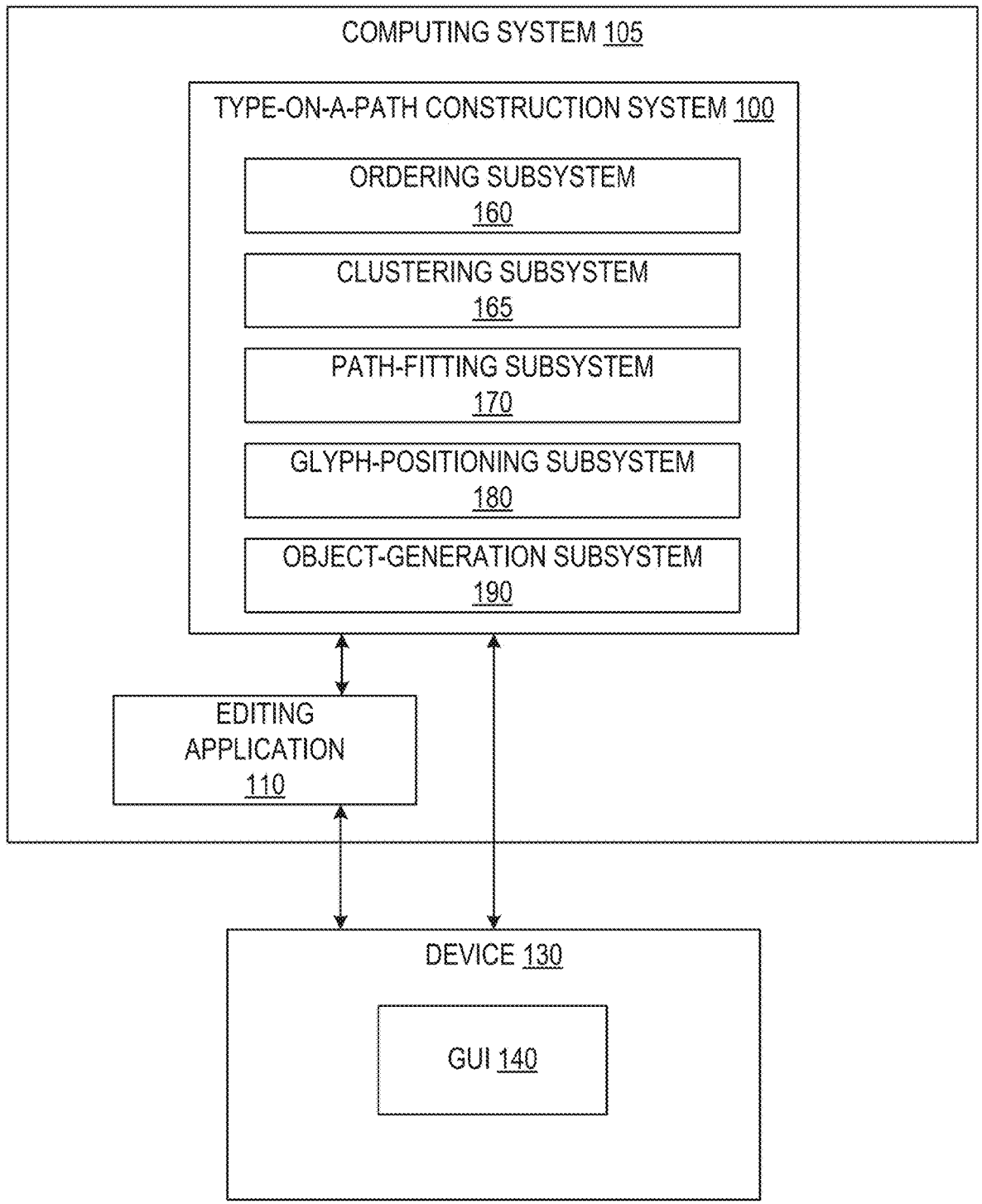
FIG. 1 is a diagram of an example of a computing system incorporating a type-on-a-path (TOP) construction system according to some embodiments described herein.

The present disclosure describes techniques for processing a set of character glyphs to construct a path for the set of character glyphs, where the character glyphs flow along an edge of the constructed path. In certain embodiment, a text object is created based on the set of character glyphs, and a path is determined and associated with the character glyphs in the text object, such that the text object can be edited or otherwise manipulated in a manner that uses path information of the determined path. In certain embodiments, the text object becomes a text-on-a-path (TOP) text object upon the character glyphs therein being associated with the determined path. The TOP text object thus constructed can then be edited or otherwise manipulated by a user in a manner that preserves and uses the path information.

In certain embodiments, systems, methods, and computer-program products executed by one or more processors are described for processing a set of character glyphs corresponding to characters and, automatically without manual intervention, constructing a path for the set of character glyphs. Processing for determining the path is agnostic of the sequence in which the character glyphs are scanned or input. The processing for determining the path includes automatically determining an order for the character glyphs, where the order is the order of the character glyphs in the text string or text object to be created based on the set of character glyphs. This order is determined based upon the positions and orientations of the character glyphs relative to one another. Some embodiments determine, or construct, a path for the set of character glyphs based on the order. A text object is then created, and the determined path is associated with the character glyphs and thus with the text object to create a TOP text object. The TOP text object thus constructed can be edited or otherwise manipulated by a user in a manner that preserves and uses the path information of the determined path.

Certain embodiments automatically determine multiple separate clusters of character glyphs. In that case, for each cluster, processing is performed to determine an order of the characters glyphs in the cluster, determine a path for the cluster, create a text object that includes the character glyphs in the cluster, and associate path information with the created character glyphs and thus with the text object to create a TOP text object that can be edited or otherwise manipulated by a user while preserving the determined path.

Certain embodiments described herein provide a novel technique for automatically determining path information for a set of individual character glyphs and using the path information to construct a TOP text object. This automated processing provides a significant technological improvement over existing techniques, which do not provide an automated way to construct a path associated with a set of character glyphs. In certain existing applications (e.g., image-editing applications), for a set of character glyphs for which path information is not available, a user has to manually create a desired path, manually select individual text pieces (e.g., character glyphs) resulting from an OCR operation, manually copy and paste each such text piece onto the newly created path, and then manually combine the text pieces together to form a TOP text object. This is a difficult and time consuming, and thus expensive, process that requires significant manual effort and skill. The level of effort and skill required is further magnified if the path to be associated with the text is complex (i.e., has a complex shape), such as if the path includes loops or sharp curves or forms a closed path, leading to errors and an unsatisfactory end product.

The automated techniques described in this disclosure provide a significant technical advance that can be used in the fields of text editing, image scanning, optical character recognition (OCR), and computer graphics. Output from existing known scanning and OCR systems can be processed by embodiments described herein to automatically analyze the scanned character glyphs and thereby generate a TOP text object including the character glyphs associated with a determined path. The techniques described herein are applicable to various types and shapes of paths, including open paths, closed paths, loops, curves, multidirectional angled paths, and others, some of which would conventionally require a high level of user expertise in generation of a TOP text object.

The following non-limiting example is provided to introduce certain embodiments. In this example, a TOP construction system accesses text pieces that include character glyphs, where each text piece includes a respective character glyph. For instance, a document is scanned and OCRed, and the output of the OCR is provided to the TOP construction system. The output of the OCR, which forms the input to the TOP construction system, includes a set of text pieces that include character glyphs, where the character glyphs may be provided in an arbitrary order and do not have associated path information, such as due to loss of the path information or due to path information not having been provided initially.

The TOP construction system automatically, and free of manual input, determines an order for the character glyphs based on relative positions and orientations of the character glyphs. For instance, the TOP construction system uses a cost function to assign a cost to each ordered pair of the character glyphs and determines an order, or logical order, for the character glyphs based on achieving a low, or minimal, total cost for a set of such ordered pairs. As a result, the character glyphs are arranged in an ordered set. Further, in some embodiments, as in this example, the TOP construction system automatically detects logical groups, or clusters, of character glyphs that are clustered together. The TOP construction system may detect multiple clusters, and in that case, each cluster corresponds to a respective text object to be created with its own respective path. In this manner, the complexities of having multiple clusters or text strings, each with its own path, is handled by the TOP construction system.

In some embodiments, after the order of the character glyphs is determined, the TOP construction system determines a path for the character glyphs. Embodiments of the TOP construction system use various techniques to determine or reconstruct a path for a set of character glyphs in a cluster. For instance, for each ordered pair of adjacent character glyphs according to the order, the TOP construction system fits a respective curve between the first character glyph and the second character glyph in the ordered pair. For instance, such curves can be Kappa curves or Bezier curves. The TOP construction system combines the various curves of the ordered pairs to form a path. In some embodiments, the TOP construction system utilizes a binary search technique to identify control points of Bezier curves to connect adjacent character glyphs, such that the control points are evenly spaced between end points of each respective curve.

In some embodiments, as in this example, the TOP construction system adjusts the positions of the character glyphs on the path to make the character glyphs appear as if the character glyphs were originally typed on the path. Adjusting the positions of the character glyphs on the path can preserve aesthetics of text art created from typing on a path. For instance, in certain embodiments, for each character glyph, the TOP construction system sets kerning (i.e., an adjustment to spacing between character glyphs) based on a distance between a character glyph and a previous character glyph, and an error is determined based on an original position of the character glyph and a new position determined from the kerning. Further, based on the error, the TOP construction system determines a new kerning value and updates the position of the character glyph a second time. An embodiment of the TOP construction system performs this iteratively for each character glyph to adjust the position the character glyphs on the path.

Having determined the order of the character glyphs and a path for the character glyphs, in this example, the TOP construction system associates the path with the character glyphs and generates a text object including the character glyphs, such that the text object is associated with the path and the character glyphs therein are associated and aligned with the path. Within the text object, the character glyphs are provided in the order determined for them and may be positioned according to the kerning computed as described above. In this example, the user can thus edit and otherwise use the text object and its associated path. For instance, if the user adds text to the text object, the added text will flow along the path, and if the user adjusts the path, the text in the text object will reflow according to the adjusted path.

As used herein, the term "character glyph" or "glyph" refers to a symbol that represents a character, such as a letter in a particular font. A character glyph representing a character in a particular font has a specific design, which defines the shape and other aspects of the appearance of the character in that particular font. For instance a character, such as the letter C, can be represented by many different character glyphs in different fonts.

As used herein, the term "text piece" refers to a portion of text that may be part or all of text that is intended to be considered as a logical group. For instance, in some embodiments, input to the TOP construction system includes multiple text pieces that include character glyphs, and an embodiment of the TOP construction system generates a text object, specifically a TOP text object, based on such character glyphs.

As used herein, the term "text object" refers to a data object that includes text, such as a set of character glyphs. In some embodiments, a text object includes a set of character glyphs combined into a united data object that is potentially editable or moveable within a document or other file.

As used herein, the term "curve" refers to a one-dimensional object that can but need not be straight. Some embodiments described herein combine multiple curves to create a path that can be associated with character glyphs to form a text object, specifically a TOP text object. In some embodiments, a curve may have two anchor points, or end points, and one or more control points. In that case, the control points define the shape of the curve.

As used herein, the term "path" refers to a continuous, or unbroken, one-dimensional object along which text, such as character glyphs, can be provided as in the case of type on a path. Some embodiments described herein construct a path based on character glyphs and associate the path with such character glyphs to form a text object, specifically a TOP text object.

As used herein, the term "type on a path" refers to text that is associated with a path, such that the text flows along (i.e., follows) an edge of the path. Some embodiments described herein generate a path based on text, specifically based on individual character glyphs making up text, and thereby convert text to type on a path. Analogously, the term "type-on-a-path" is a descriptor applied to entities, such as the TOP construction system, related to text associated with a path such that the text flows along an edge of the path.

As used herein, the term "text-on-a-path text object" or "TOP text object" refers to a text object that includes character glyphs associated with a path such that the character glyphs flow along an edge of the path. In some embodiments, when a TOP text object is edited, text being added also flows along the path, and when the path itself is modified, the positions or orientations of the character glyphs update such that the character glyphs remain on the path.

Referring now to the drawings, FIG. 1 shows an example of a computing system 105 incorporating a TOP construction system 100 according to certain embodiments. The directions of the various arrows shown in FIG. 1 illustrate an example communications flow; however, these arrows are provided for illustrative purposes only and do not limit the various embodiments described herein. Some embodiments of the TOP construction system 100 access text pieces provided in an arbitrary order and determine an ordering for character glyphs in those text pieces along a path, thereby reconstructing a path for the text. Thus, an example of the TOP construction system 100 can construct a path for text and, more specifically in some instances, can reconstruct a path that was lost in previous processing of the text.

Figure 2:
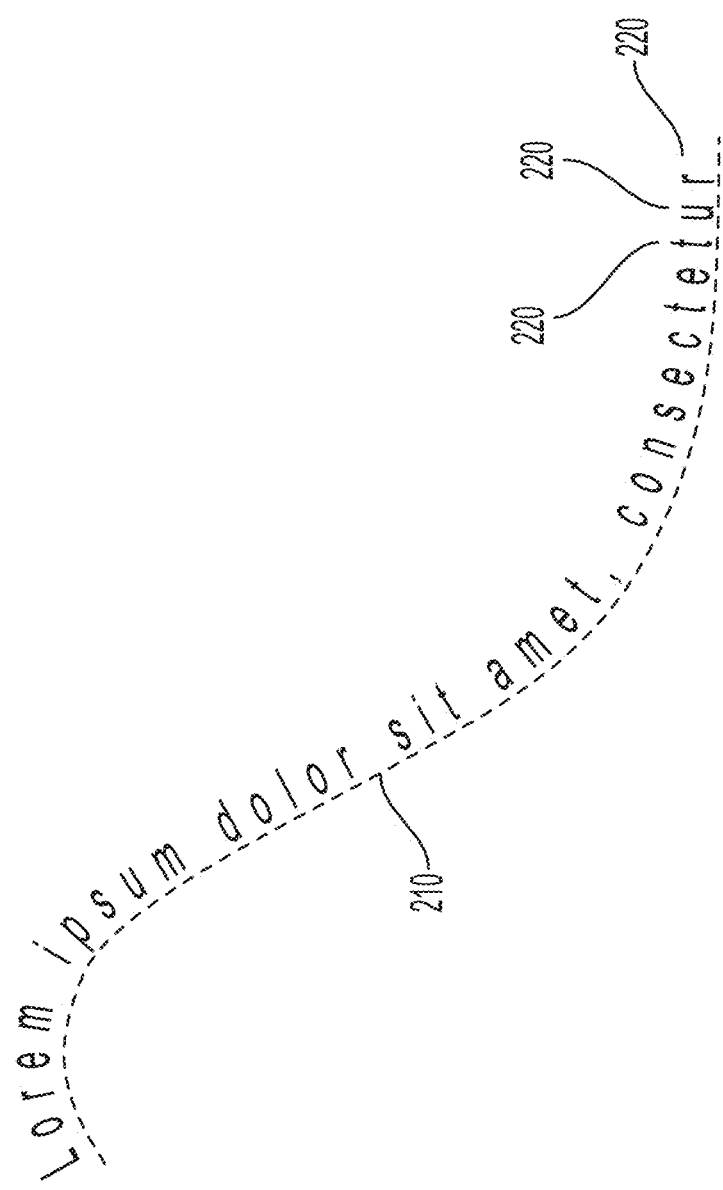
FIG. 2 shows an example of text that was initially typed as a text object associated with a path and has been reconstructed according to some embodiments described herein.

FIG. 2 shows an example of text that was initially typed as a text object on a path 210 and has been reconstructed according to some embodiments described herein. For instance, information about the path was lost, such as through document format conversion or through printing and scanning the text. Although the path 210 is visible after reconstruction in this example, that need not be the case in some embodiments.

When initially created by a user, the path determined where each character glyph 220 was placed during typing of the text in this example. For instance, certain image-editing or document-editing applications enable a user to indicate a path and then enter text, such that the text flows along the path. However, when this text is exported to some other format, the information about the path may be lost. For instance, if the text is printed and the resulting printed page is scanned to produce a scanned image of the text, then information about the path is lost when performing OCR on the scanned image. The result is a set of text pieces, each text piece including one or more multiple character glyphs 220, where the text pieces are no longer in the order in which they were originally typed but, rather, are in an order determined based on horizontal scan lines from top to bottom. Some embodiments of the TOP construction system construct (e.g., reconstruct) the original text object, thereby enabling a user to utilize the text and associated path 210 as the user could initially upon creation of the text.

Referring back to FIG. 1, the embodiment depicted is merely an example and is not intended to unduly limit the scope of claimed embodiments. One of ordinary skill in the art would recognize many possible variations, alternatives, and modifications. For example, in some implementations, more or fewer systems or components than those shown in FIG. 1 may be provided, two or more systems or components may be combined, or a different configuration or arrangement of systems and components may be provided. The systems, including subsystems, and other components depicted in FIG. 1 may be implemented in software (e.g., program code or instructions) executed by one or more processing units (e.g., processors or processor cores), in hardware (e.g., as a specialized hardware circuit installed on the computing system 105), or combinations thereof. The software may be stored in a non-transitory storage medium such as memory device.

For example, in the embodiment depicted in FIG. 1, the TOP construction system 100 runs on the computing system 105. In alternative embodiments, the TOP construction system 100 may run on a distributed system of computing devices. For example, the TOP construction system 100 may be implemented by one or more computing systems of a cloud service provider infrastructure. The computing system 105 can be of various types including but not limited to a consumer device such as a desktop computer, a notebook computer, a tablet, or a smartphone. The TOP construction system 100 may be implemented as program code installed on such a consumer device.

As shown in FIG. 1, an embodiment of the TOP construction system 100 is in communication with an editing application 110, such as a document-editing application or an image-editing application, running on the computing system 105, such that the TOP construction system 100 provides the operations described herein through the editing application 110. Additionally or alternatively, however, the TOP construction system 100 is integrated with the editing application 110. For instance, an embodiment of the TOP construction system 100 is in communication with, or integrated with, an editing application 110, such as an image-editing application such as Adobe® Photoshop®, Adobe Illustrator, or Adobe Premiere®. The editing application 110 utilizes the TOP construction system 100 to reconstruct a path 210 or, in some embodiments, to initially construct a path 210 based on arbitrarily positioned character glyphs 220. In one example, when a user of the editing application 110 requests for a path 210 to be constructed (e.g., reconstructed) based on text pieces that include character glyphs 220, the editing application 110 communicates with the TOP construction system 100, which reconstructs the path 210 and communicates to the editing application a text object that includes the various character glyphs 220 in order and associated with a path 210.

In some embodiments, a device 130 acts as an output device for the computing device 130 and for the TOP construction system 100. For instance, the editing application 110 generates a graphical user interface (GUI) 140 and causes the GUI 140 to be displayed on the device 130. The GUI 140 enables a user to interact with the editing application 110 and or directly with the TOP construction system 100. Further, the user provides a set of text pieces including character glyphs 220 in the GUI 140 and utilizes the GUI 140 to request construction of a path 210 for the character glyphs 220. The device 130 communicates this request to the editing application 110, which communicates with the TOP construction system 100 to construct a text object associated with a path 210 as described herein. The editing application 110 then causes the GUI 140 to show the resulting text object in the GUI 140, where the user can manipulate or utilize the text box as desired.

Examples of the device 130 can take various forms. In one example, the device 130 is a monitor in communication with the computing device 130. In another example, however, the device 130 is a screen integrated with the computing device 130; for instance, the device 130 could be a smartphone, tablet, or notebook computer, and the device 130 could be an integrated display. In yet another example, the computing system 105 on which the TOP construction system 100 runs provides a cloud-based service, and the device 130 is a consumer device utilizing the cloud-based service such that the computing system 105 causes such consumer device to display the GUI 140.

As shown in FIG. 1, an embodiment of the TOP construction system 100 includes an ordering subsystem 160, a path-fitting subsystem 170, a glyph-positioning subsystem 180, and an object-generation subsystem 190. Generally, the ordering subsystem 160 determines an order for character glyphs 220 and possibly attempts to group the character glyphs 220 into clusters, the path-fitting subsystem 170 fits a path 210 to the character glyphs 220 based on the order for the character glyphs 220 and associates the path with the character glyphs, the glyph-positioning system 180 adjusts the positions of the character glyphs 220 based on the path 210, and the object-generation subsystem 190 generates and outputs a text object that includes the character glyphs 220 in order along the path 210 and associated with the path 210. Some embodiments of the TOP construction system 100 further include a clustering subsystem 165, which breaks the character glyphs 220 into groups. When character glyphs 220 are broken into groups in some embodiments, the path-fitting subsystem 170 determines a path 210 for each such group, and the glyph-positioning subsystem 180 positions (e.g., repositions or adjusts the position of) each character glyph 220 on the respective path 210 for the group of that character glyph 220.

Figure 3:
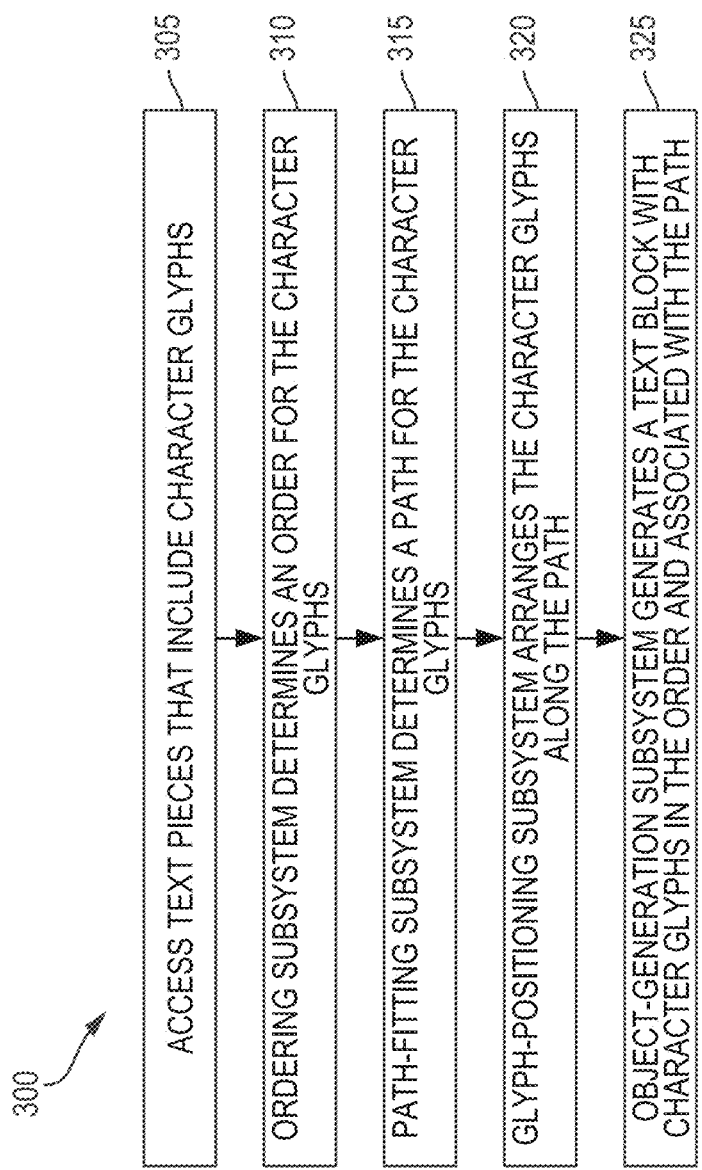
FIG. 3 is a diagram of a process of constructing a text object associated with a path, as performed by the TOP construction system, according to some embodiments described herein.

FIG. 3 is a diagram of a process 300 of constructing, for instance, reconstructing, a text object associated with and aligned along a path 210 (i.e., constructing type on a path 210), according to some embodiments described herein. In some embodiments, this process 300 is an example of an overall process performed by the TOP construction system 100, as shown in FIG. 1, to input character glyphs 220 and output a text object. The process 300 depicted in FIG. 3, as well as other processes described herein, may be implemented in software (e.g., as code, instructions, or programs) executed by one or more processing units (e.g., processors or processor cores), in hardware, or combinations thereof. The software may be stored on a non-transitory storage medium, such as on a memory device. The process 300 depicted in FIG. 3 and described below is intended to be illustrative and non-limiting. Although FIG. 3 depicts various activities occurring in a particular sequence or order, this is not intended to be limiting. In certain embodiments, for instance, the activities may be performed in a different order, or one or more activities of the process 300 may be performed in parallel. In certain embodiments, the process 300 may be performed by the TOP construction system 100.

As shown in FIG. 3, at block 305, the process 300 involves accessing a set of text pieces that include character glyphs 220. For instance, each text pieces includes one, and possibly more, character glyphs 220. In one example, the editing application 110 opens a file, such as an image or a document, that includes text pieces, where each text piece is a respective text object that is only a piece of a larger portion of text. For instance, the user requests that the editing application 110 open the file. The file could be the result of having scanned a document and performed OCR on text in the document, or the file could have exported from another application. In another example, the text was typed or otherwise provided, such as by a user, in an arbitrary arrangement of text pieces including character glyphs 220, and a user now invokes the TOP construction system 100 to generate a path 210 for the text pieces to enable intuitive editing of the text made up of the character glyphs 220 in the text pieces. In either case, text that was intended to flow along a path 210 is provided to the TOP construction system 100 as a set of disconnected text pieces that are out of order and not associated with any path in particular.

At block 310, the process 300 involves determining an order for the character glyphs 220. As described above, the text pieces accessed at block 305 are not necessarily provided in an arrangement in which the character glyphs 220 therein were intended to be arranged. For instance, if the text pieces are a result of having scanned a document, such as digitally or by way of scanner device, then the sequence of the text pieces as accessed in block 305 is based on the scanning process; for instance, the text pieces could be initially ordered based on a top-to-bottom, left-to-right ordering. Thus, some embodiments of the ordering subsystem 160 of the TOP construction system 100 determine an order based on spacing or orientation of the text pieces and, specifically, of the character glyphs 220 in the text pieces.

At block 315, the process 300 involves determining a path 210 for the character glyphs 220 in the text pieces. For instance, some embodiments of the TOP construction system 100 fit a set of curves to the glyphs 220 in the text pieces, as ordered based on the order determined at block 310. Specifically, for instance, an example of the path-fitting subsystem 170 of the TOP construction system 100 fits a respective curve between each pair of glyphs 220 that are adjacent according to the order determined at block 310.

At block 320, the process 300 involves positioning the various character glyphs 220 along the path 210 determined for the character glyphs 220 at block 315. For instance, an example of the glyph-positioning subsystem 180 of the TOP construction system 100 adjusts the kerning between adjacent character glyphs 220. In some embodiments, positioning the character glyphs 220 on the path 210 in this manner can provide aesthetic appeal, prevent overlapping character glyphs 220, and make the character glyphs 220 appear as if the character glyphs 220 were originally typed on the path 210. In short, positioning the character glyphs 220 on the path 210 can preserve aesthetics of text art created from typing on a path.

At block 325, the process 300 involves generating and outputting a logical path object, such as a text object, that has the character glyphs 220 arranged in the order determined in block 310 and associated with the path 210 determined at block 315. For instance, the object-generation subsystem 190 of the TOP construction system 100 generates and outputs the logical path object, such as a text object.

Figure 4:
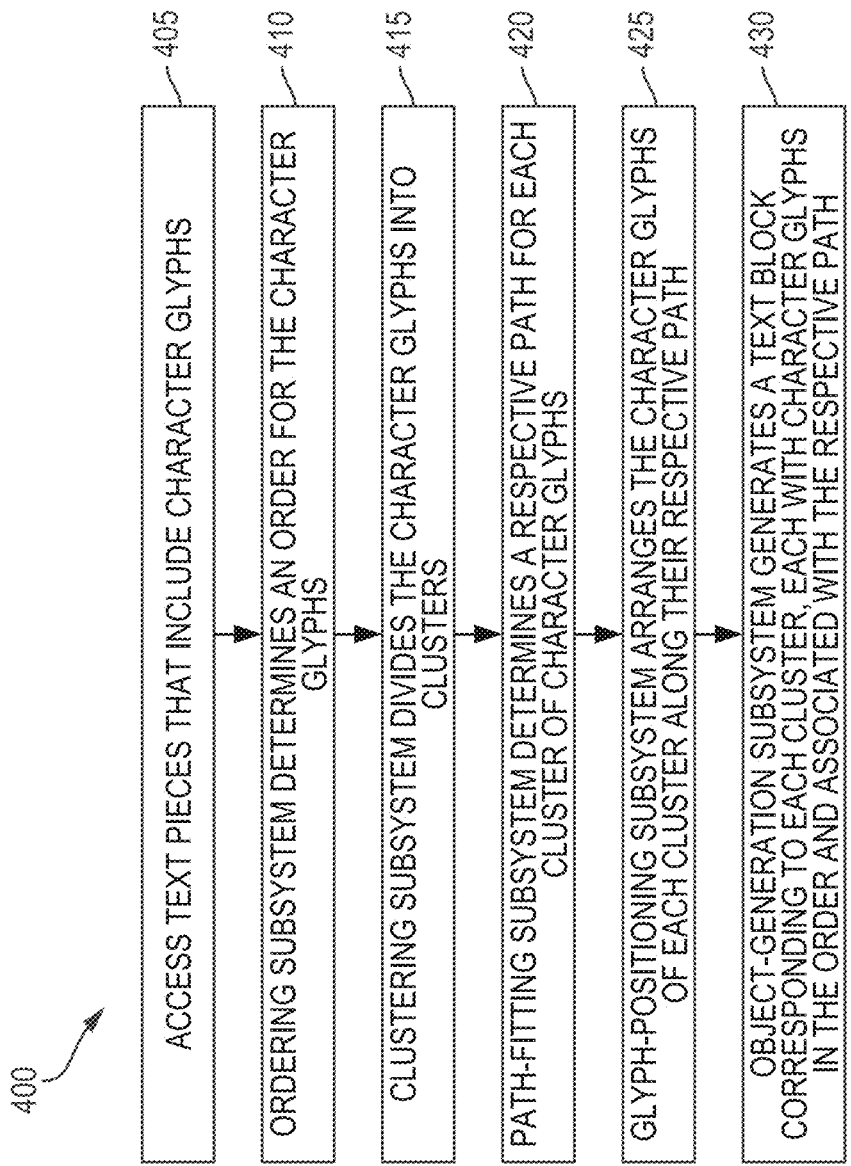
FIG. 4 is another diagram of a process of constructing a text object associated with a path, as performed by the TOP construction system, according to some embodiments described herein.

FIG. 4 is another diagram of a process 400 of constructing, for instance, reconstructing, a text object associated with and aligned along a path 210 (i.e., constructing type on a path 210), according to some embodiments described herein. In some embodiments, this process 400 is another example of an overall process performed by the TOP construction system 100, as shown in FIG. 1, to input character glyphs 220 and output a text object. The process 400 depicted in FIG. 4, as well as other processes described herein, may be implemented in software (e.g., as code, instructions, or programs) executed by one or more processing units (e.g., processors or processor cores), in hardware, or combinations thereof. The software may be stored on a non-transitory storage medium, such as on a memory device. The process 400 depicted in FIG. 4 and described below is intended to be illustrative and non-limiting. Although FIG. 4 depicts various activities occurring in a particular sequence or order, this is not intended to be limiting. In certain embodiments, for instance, the activities may be performed in a different order, or one or more activities of the process 400 may be performed in parallel. In certain embodiments, the process 400 may be performed by the TOP construction system 100.

As shown in FIG. 4, at block 405, the process 400 involves accessing a set of text pieces that include character glyphs 220. For instance, each text pieces includes one, and possibly more, character glyphs 220. In one example, the editing application 110 opens a file, such as an image or a document, that includes text pieces, where each text piece is a respective text object that is only a piece of a larger portion of text. For instance, the user requests that the editing application 110 open the file. The file could be the result of having scanned a document and performed OCR on text in the document, or the file could have exported from another application. In another example, the text was typed or otherwise provided, such as by a user, in an arbitrary arrangement of text pieces including character glyphs 220, and a user now invokes the TOP construction system 100 to generate a path 210 for the text pieces to enable intuitive editing of the text made up of the character glyphs 220 in the text pieces. In either case, text that was intended to flow along a path is provided to the TOP construction system 100 as a set of disconnected text pieces that are out of order and not associated with any path in particular.

At block 410, the process 400 involves determining an order for the character glyphs 220. As described above, the text pieces accessed at block 405 are not necessarily provided in an arrangement in which the character glyphs 220 therein were intended to be arranged. For instance, if the text pieces are a result having scanned a document, such as digitally or by way of scanner device, then the sequence of the text pieces as accessed in block 405 is based on the scanning process; for instance, the text pieces could be initially ordered based on a top-to-bottom, left-to-right ordering. Thus, some embodiments of the ordering subsystem 160 of the TOP construction system 100 determine an order based on spacing or orientation of the text pieces and, specifically, of the character glyphs 220 in the text pieces.

At block 415, the process 400 involves dividing the character glyphs 220 into clusters, or groups. In some embodiments, when the clustering subsystem 165 of the TOP construction system 100 determines that a dividing condition is met for a pair of character glyphs 220, including a first character glyph 220 and a second character glyph 220, that are adjacent according to the order determined at block 410, then the clustering subsystem 165 adds the first character glyph 220 to an existing cluster and creates a new cluster. The clustering subsystem 165 adds the second character glyph 220 to the new cluster, thus splitting the two character glyphs 220 into distinct clusters. An example of the clustering subsystem 165 splits all such pairs that meet the dividing condition and, as a result, divides the character glyphs 220 into clusters.

At block 420, the process 400 involves determining a respective path 210 for each cluster of character glyphs 220. For instance, some embodiments of the path-fitting subsystem 170 of the TOP construction system 100 fit a set of curves to the character glyphs 220 in a cluster, as ordered based on the order determined at block 410. Specifically, for instance, an example of the path-fitting subsystem 170 fits a respective curve between each pair of character glyphs 220 that are adjacent according to the order determined at block 410, and the path-fitting subsystem 170 determines a path 210 based on the various curves connecting character glyphs 220 in a cluster. In some embodiments, this is performed for each cluster.

At block 425, the process 400 involves positioning the various character glyphs 220 along their respective paths 210 determined at block 420. For instance, an example of the glyph-positioning subsystem 180 of the TOP construction system 100 adjusts the kerning between adjacent character glyphs 220. In some embodiments, positioning the character glyphs 220 on the path 210 in this manner can provide aesthetic appeal, prevent overlapping character glyphs 220, and make the character glyphs 220 appear as if the character glyphs 220 were originally typed on the path 210. In short, positioning the character glyphs 220 on the path 210 can preserve aesthetics of text art created from typing on a path.

At block 430, the process 400 involves generating and outputting a single logical path object, such as a text object, per cluster. For each cluster, in the respective text block or other logical path object, the character glyphs 220 are arranged in the order determined in block 410 and associated with the respective path 210 determined at block 420 in the respective logical path object. For instance, the object-generation subsystem 190 of the TOP construction system 100 generates and outputs each such logical path object, such as in the form of a text object per cluster.

Determining an Order for Character Glyphs

Figure 5:
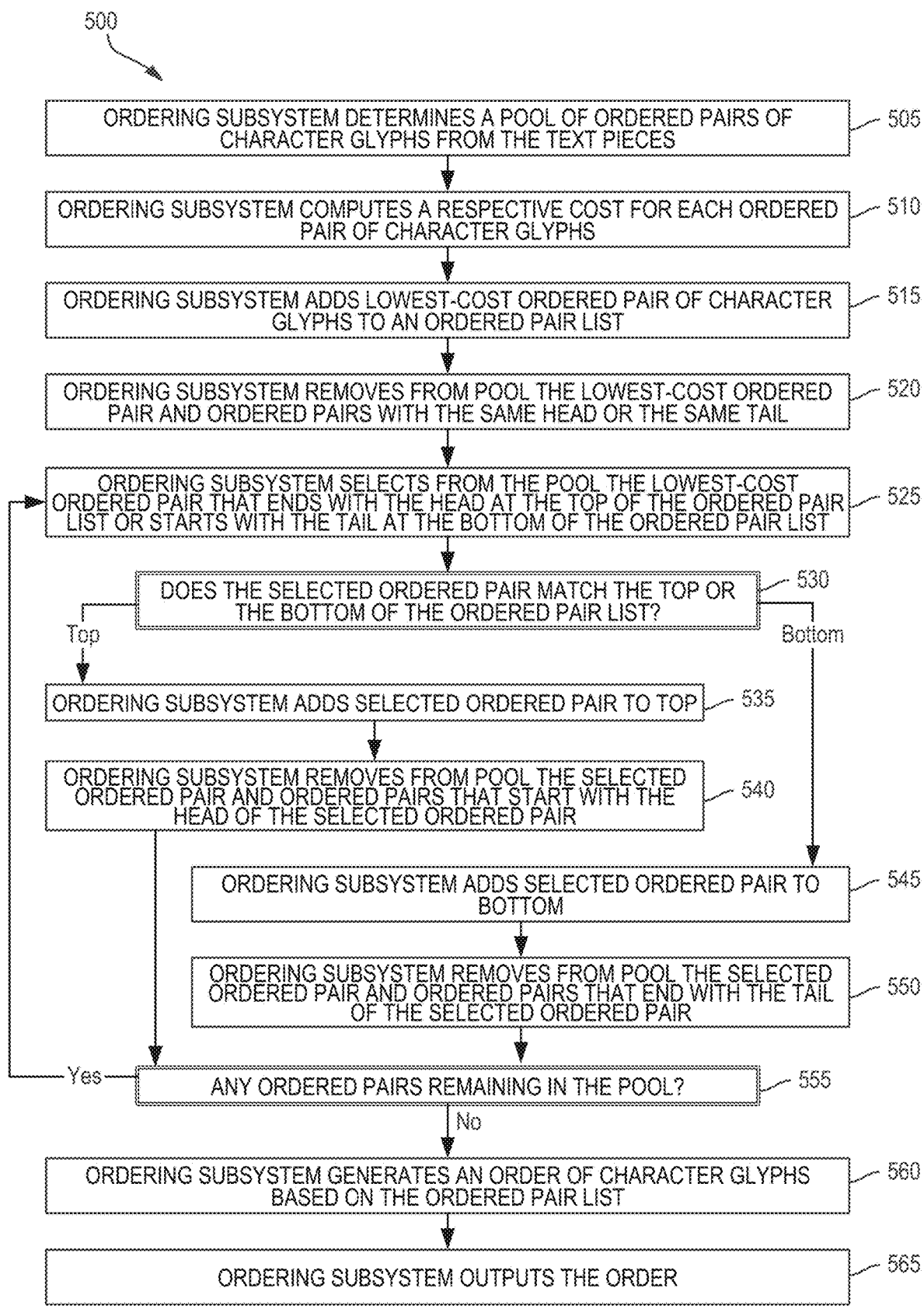
FIG. 5 is a diagram of a process of determining an order of character glyphs in text for which path construction is desired, as performed by an ordering subsystem of the TOP construction system, according to some embodiments described herein.

FIG. 5 is a process 500 of determining an order, or ordered list, of the character glyphs 220, according to some embodiments. In some embodiments, the ordering subsystem 160 of the TOP construction system 100 performs this process 500 or similar to determine an order for the character glyphs 220 as might have been intended by an original user who typed or otherwise provided text made up of the text pieces along a path before path information was lost. Generally, this process 500 uses cues from position and orientation to determine how the character glyphs 220 should be ordered. For instance, an example of the ordering subsystem 160 uses a heuristic technique, as described below, that assigns a cost to each ordered pair of character glyphs 220 based on position and orientation of the character glyphs 220 and thereby determines an order with a small or minimal penalty.

The process 500 depicted in FIG. 5, as well as other processes described herein, may be implemented in software (e.g., as code, instructions, or programs) executed by one or more processing units (e.g., processors or processor cores), in hardware, or combinations thereof. The software may be stored on a non-transitory storage medium, such as on a memory device. The process 500 depicted in FIG. 5 and described below is intended to be illustrative and non-limiting. Although FIG. 5 depicts various activities occurring in a particular sequence or order, this is not intended to be limiting. In certain embodiments, for instance, the activities may be performed in a different order, or one or more activities of the process 500 may be performed in parallel. In certain embodiments, the process 500 may be performed by the ordering subsystem 160 of the TOP construction system 100.

As shown in FIG. 5, at block 505, the process 500 involves determining a pool (i.e., a set) of ordered pairs of character glyphs 220 from the character glyphs 220 of text pieces for which a path 210 is to be constructed. In some embodiments, the ordering subsystem 160 considers all ordered pairs of character glyphs 220 from the text pieces when determining an order for the character glyphs 220. Thus, an example of the ordering subsystem 160 adds to the pool each possible ordered pair of character glyphs 220 from the text pieces, which includes a number of ordered pairs $n = x(x-1)$ when there are a total of x character glyphs 220. In some embodiments, each character glyph 220 from the text pieces is considered distinct. For instance, a first character glyph 220 having a first position and orientation is considered different from a second character glyph 220 having a second position and orientation, even if the first character glyph 220 and the second character glyph 220 may represent the same character from the same font. Further, if a text piece includes multiple character glyphs 220, then each such character glyph 220 may be considered as an individual when determining ordered pairs.

At block 510, the process 500 involves computing a respective cost, or penalty, for each ordered pair determined in block 505. Various techniques could be used to determine a cost for an ordered pair. In some embodiments, the ordering subsystem 160 applies a cost function to each ordered pair to determine a cost to assign to the ordered pair, where that cost function is based on a distance between the character glyphs 220 in the ordered pair or a difference in orientation (e.g., a difference in tangents) between the character glyphs 220 in the ordered pair, or both.

For example, the cost, C, of an ordered pair (a, b) of the character glyphs a and b could be computed as follows:

$$DeltaTangentCriteria = |atan(a.\text{tangent}) - atan(b.\text{tangent})|$$

$$\text{Distance Criteria} = dist(a.\text{right}, b.\text{left})$$

$$sumTangentVector = a.\text{tangent} + b.\text{tangent}$$

$$H(x) = \begin{cases} \max, & \text{if } x = \text{dot}(sumTangentVector, glyph2glyphVector) \leq 0 \\ 1, & \text{if } x = \text{dot}(sumTangentVector, glyph2glyphVector) = 0 \end{cases}$$

$$C(a, b) = H(x) \times (DeltaTangentsCriteria + DistanceCriteria)$$

In the above, a.tangent and b.tangent are respectively the tangents of reference boxes of the character glyphs 220 in the pair; for instance, the tangent of a character glyph 220 is a vector in the direction of the bottom of the reference box (e.g., the em-box or a bounding box) of the character glyph 220 in the forward direction (e.g., right in a left-to-right language) of the character glyph 220. Specifically, the em-box of a font to which a character glyph 220 belongs, in the same or similar font size as the character glyph 220, may be used as the reference box for the purpose of this calculation or others described herein, in some embodiments. In the above, atan( ) returns the arctangent of its input; a.right is the point at the lower-right corner of the reference box of character glyph a; b.left is the point at the lower-left corner of the reference box of character glyph b; and dist( ) returns the distance between two points. In some embodiments, the distance is a positive number, and thus, the dist( ) function may incorporate an absolute value. Additionally, in the above, max is a maximum value that is known to exceed any other cost value that will be computed; for instance, max is the highest value that can be assigned to the variable of variable type (e.g., float) used for max, such that max is effectively infinity. Lastly, glyph2glyphVector is the unit vector from a.anchor to b.anchor, where the anchor of a character glyph 220 is the point in the center of the bottom of its reference box.

In the above example cost function, the helper function H(x) is used to effectively disqualify, by virtue of a too-large value, an ordered pair where sumTangentVector makes an obtuse angle with glyph2glyphVector. When these vectors make an obtuse angle, the second character glyph 220 of the pair, b, is to the left of the first character glyph, a. In a left-to-right language, this would not be the case if character glyph a where meant to immediately precede character glyph b. When working with a right-to-left language, however, an example of H(x) assigns the max value when these two vectors make an acute angle.

Figure 6:
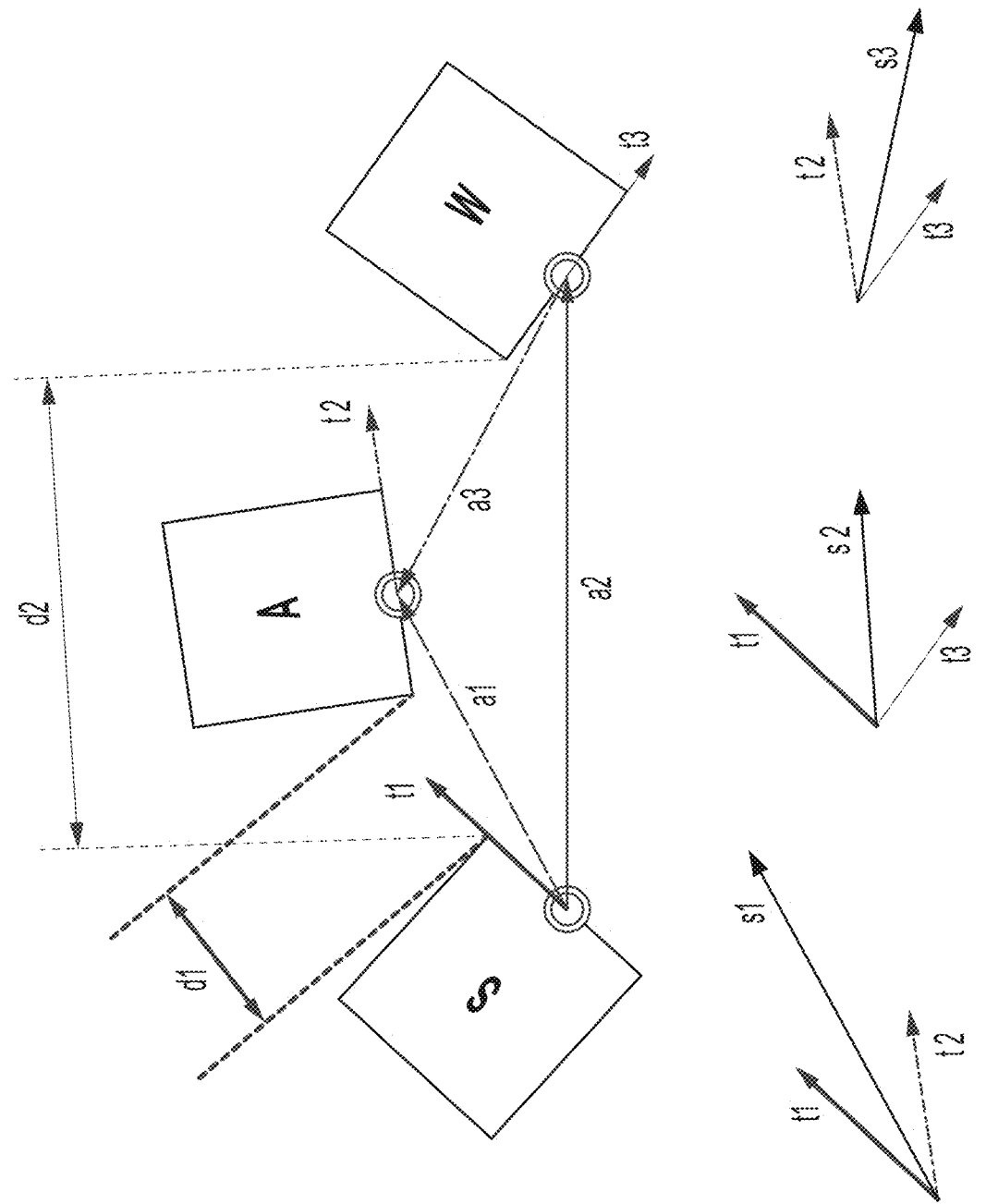
FIG. 6 shows an example of character glyphs and illustrates certain vectors used as variables in a cost function for determining the order, according to some embodiments described herein.

FIG. 6 shows an example of a set of character glyphs 220 and illustrates certain vectors used as variables in the above cost function. Specifically, in this example, there are three text pieces, each corresponding to a respective character glyph S, A, or W. This example shows certain vectors with respect to the ordered pair of character glyphs (S, A), (S, W), and (W, A). Note that the correct order, which is identified by some embodiments described herein, is S, A, and then W.

As shown in FIG. 6, in this example, vector t1 is the tangent of the character glyph S, vector t2 is the tangent of the character glyph A, and vector t1 is the tangent of the character glyph W. Additionally, sumTangentVector for (S, A) is shown as vector s1, sumTangentVector for (S, W) is shown as vector s2, and sumTangentVector for (W, A) is shown as vector s3. Additionally, glyph2glyphVector for (S, A) is shown as vector a1, glyph2glyphVector for (S, W) is shown as vector a2, and glyph2glyphVector for (W, A) is shown as vector a3. Lastly, in this example, the respective distances between character glyphs S and A and between character glyphs S and W are shown as d1 and d2.

In this example, for the ordered pair (W, A), sumTangentVector s3 makes an obtuse angle with glyph2glyphVector, and this the cost function determines a cost of effectively infinity for the ordered pair. As such, and as will be described further below, this ordered pair will not be selected as part of the order of the character glyphs 220. Further, the cost function assigns a lower value to the ordered pair (S, A), which is a correct ordering of character glyphs 220 that should be deemed adjacent, than to the ordered pair (S, W), which includes character glyphs 220 that ordered correctly but that should not be deemed adjacent.

Returning to FIG. 5, at block 515, the process 500 involves selecting a lowest-cost ordered pair from the pool and adding that ordered pair to an ordered pair list, which is an ordered list of ordered pairs, that will represent the order being determined. Specifically, for instance, the ordered pair selected has a cost computed at block 510 that is no higher than the cost computed for any other ordered pair at block 510. In some embodiments, this process 500 continues to grow this ordered pair list from the top (i.e., the front) and from the bottom (i.e., the back); for instance, the ordered pair list could be implemented as a double-ended queue.

At block 520, the process 500 involves removing from the pool of ordered pairs (a) lowest-cost ordered pair selected at block 515 and (b) each ordered pair that starts with the head (i.e., the first character glyph 220 of the internal order of the ordered pair) of the lowest-cost ordered pair or ends with the tail (i.e., the second character glyph 220 of the internal order of the ordered pair) of the lowest-cost ordered pair. Because each character glyph 220 is considered distinct for this purpose (e.g., two character glyphs 220 of the letter S are deemed to be different), a particular character glyph 220 can have only one character glyph 220 in front of it and only one other character glyph 220 behind it.

In some embodiments, when an ordered pair of character glyphs 220 is added to the ordered pair list as the first character glyph 220 in an ordered pair, this indicates that the two character glyphs 220 are deemed adjacent and in the correct order. Thus, an embodiment of the ordering subsystem 160 determines that the first character glyph 220 of the pair cannot come immediately before any other character glyph 220 in the text pieces and that second character glyph 220 in the pair cannot come immediately after any other character glyph 220 in the text pieces. Thus, the ordering subsystem 160 removes such ordered pairs from the pool and, thereby, from consideration.

Block 525 begins a loop in which an ordered pair of character glyphs 220 is added to the ordered pair list during each iteration. In short, the process determines a minimum spanning tree among the ordered pairs by adding ordered pairs to the ordered pair list based on cost (e.g., to minimize total cost).

At block 525, the process 500 involves selecting from the pool the lowest-cost ordered pair that meets a condition, specifically, that matches the top of the ordered pair list or the bottom of the ordered pair list. In some embodiments, the ordering subsystem 160 selects the lowest-cost ordered pair that remains in the pool and that either (a) has a second character glyph 220 in its internal order that is the same as the first character glyph 220 in the ordered pair at the top of the ordered pair list (e.g., in the first iteration of the loop, the lowest-cost ordered pair selected and added at block 515) or (b) has a first character glyph 220 in its internal order that is the same as the second character glyph 220 in the ordered pair at the bottom of the ordered pair list.

At decision block 530, the process 500 involves determining whether the selected ordered pair, which was selected at block 525, matches the top of the ordered pair list or the bottom of the ordered pair list. For instance, if the selected ordered pair has a second character glyph 220 in its internal order that is the same as the first character glyph 220 in the ordered pair at the top of the ordered pair list, then the selected order pair matches the top of the ordered pair list. If the selected ordered pair has a first character glyph 220 in its internal order that is the same as the second character glyph 220 in the ordered pair at the bottom of the ordered pair list, then the selected order pair matches the bottom of the ordered pair list.

If the selected ordered pair matches the top of the ordered pair list, then the process 500 proceeds to block 535. However, if the selected ordered pair matches the bottom of the ordered pair list, then the process 500 proceeds to block 545.

At block 535, the process 500 involves adding the selected ordered pair to the top of the ordered pair list. For instance, if the ordered pair list is implemented as a double-ended queue, then an embodiment of the ordering subsystem 160 pushes the selected ordered pair onto the front of the ordered queue. At block 540, the process 500 involves removing from the pool of ordered pairs (a) the selected ordered pair that was added to the ordered pair list at block 535 and (b) each ordered pair that starts with the head (i.e., the first character glyph 220 of the internal order of the selected ordered pair) of the selected ordered pair. The process 500 then proceeds to decision block 555.

At block 545, the process 500 involves adding the selected ordered pair to the bottom of the ordered pair list. For instance, if the ordered pair list is implemented as a double-ended queue, then an embodiment of the ordering subsystem 160 pushes the selected ordered pair onto the back of the ordered queue. At block 550, the process 500 involves removing from the pool of ordered pairs (a) the selected ordered pair that was added to the ordered pair list at block 545 and (b) each ordered pair that ends with the tail (i.e., the second character glyph 220 of the internal order of the selected ordered pair) of the selected ordered pair. The process 500 then proceeds to decision block 555.

At decision block 555, the process 500 determines whether any ordered pairs remain in the pool for consideration. If such an ordered pair remains in the pool, the process 500 returns to block 525 to selected another ordered pair for addition to the ordered pair list. However, if no such ordered pairs remain in the pool, then the process 500 proceeds to block 560.

At block 560, the process 500 involves generating the order of the character glyphs 220 of the text pieces, based on the ordered pair list. For instance, an embodiment of the ordering subsystem 160 iterates through the ordered pairs on the ordered pair list, adding each character glyph 220 to the order a single time. In some embodiments, the ordered pair list now includes a set of ordered pairs, such that each adjacent ordered pair in the list has a first ordered pair with a tail matching a head of the second ordered pair. The ordering subsystem 160 steps through each character glyph 220 in the ordered pairs of the ordered pair list, starting with the first character glyph 220 in the ordered pair at the top, and adds each character glyph 220 encountered to the order a single time. At the end of such iterations, the ordering subsystem 160 has added all the character glyphs 220 of the text pieces to the order, based on the ordered pair list.

At block 565, the process 500 outputs the order, which is, for instance, an ordered list of character glyphs 220 rather than ordered pairs of character glyphs 220. In some embodiments, the TOP construction system 100 uses the order of the character glyphs 220 to determine a path 210 as described in more detail below.

Clustering Character Glyphs

As mentioned above, some embodiments of the TOP construction system 100 group the character glyphs 220 into clusters 710. In some embodiments, the TOP construction system 100 groups the character glyphs 220 into clusters 710 while determining the order of the character glyphs 220. For instance, FIG. 7 shows an example of character glyphs 220 that could be arranged in clusters 710, according to some embodiments described herein. Specifically, the example of FIG. 7 illustrates a first set of character glyphs 220 assigned to a first cluster 710a and a second group of character glyphs 220 assigned to a second cluster 710b. Generally, the grouping of character glyphs 220 into multiple clusters 710 indicates that the TOP construction system 100 deems each group to be a separate portion of text rather than being part of a larger continuous text that includes all the character glyphs 220.

Figure 8:
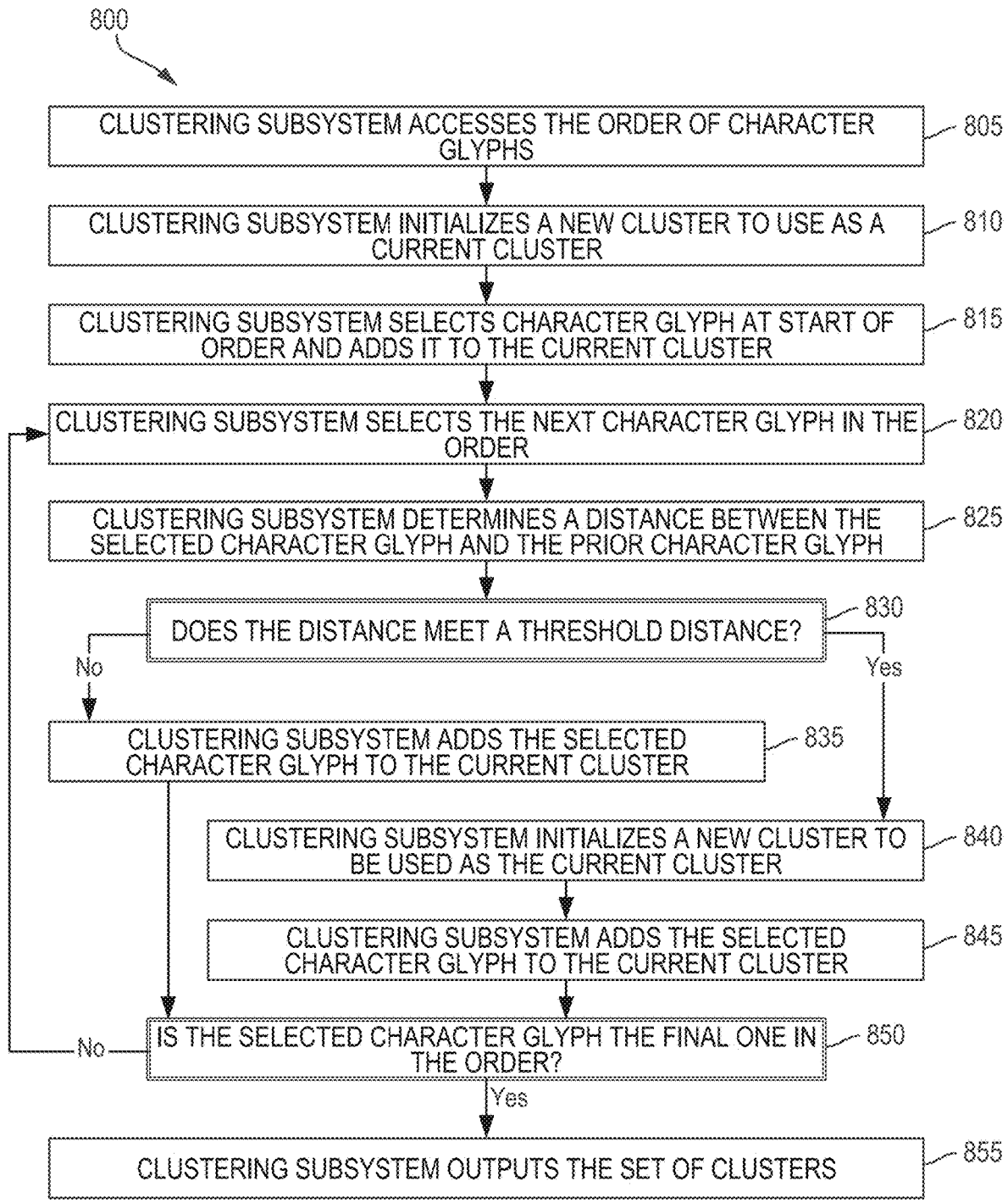
FIG. 8 is a diagram of a process of grouping the character glyphs into clusters, as performed by a clustering subsystem of the TOP construction system, according to some embodiments described herein.

FIG. 8 is a diagram of a process 800 of grouping the character glyphs 220 into clusters 710, according to some embodiments described herein. In some embodiments, the clustering subsystem 165 of the TOP construction system 100 performs this process 800 following the process 500 for determining an order of the character glyphs 220. For instance, given the order output at block 565 above, an embodiment of the clustering subsystem 165 iterates through the order, as described below, to break the character glyphs 220 into clusters 710.

The process 800 depicted in FIG. 8, as well as other processes described herein, may be implemented in software (e.g., as code, instructions, or programs) executed by one or more processing units (e.g., processors or processor cores), in hardware, or combinations thereof. The software may be stored on a non-transitory storage medium, such as on a memory device. The process 800 depicted in FIG. 8 and described below is intended to be illustrative and non-limiting. Although FIG. 8 depicts various activities occurring in a particular sequence or order, this is not intended to be limiting. In certain embodiments, for instance, the activities may be performed in a different order, or one or more activities of the process 800 may be performed in parallel.

In certain embodiments, the process 800 may be performed by the clustering subsystem 165 of the TOP construction system 100.

As shown in FIG. 8, at block 805, the process 800 involves accessing the order, or ordered list, of character glyphs 220. As described above, an embodiment of the TOP construction system 100 generated the order by adding ordered pairs to the top of bottom of an ordered pair list based on costs assigned to such ordered pairs and then iterating through the ordered pair list to form the order of character glyphs 220.

At block 810, the process 800 involves initializing a new cluster 710 to use as a current cluster 710, where the new cluster 710 is initially empty. In some embodiments, the clustering subsystem 165 will add character glyphs 220 to the current cluster 710 until another cluster 710 is created. At block 815, the process 800 involves selecting the character glyph 220 at the beginning of the order and adding that character glyph 220 to the current cluster 710.

Block 820 begins a loop. In each iteration of the loop, a character glyph 220 is selected, and it is determined whether a new cluster 710 should be created for the selected character glyph 220. Specifically, at block 820, the process 800 involves incrementing to the next character glyph 220 in the order, such that the next character glyph 220 (i.e., adjacent to the character glyph 220 most recently added to a cluster 710) becomes the selected character glyph 220.

At block 825, the process 800 involves determining a distance between the selected character glyph 220 and the prior character glyph 220 according to the order. In some embodiments, the TOP construction system computes a distance from a first character glyph 220 to a second character glyph 220 as the distance from the bottom-right corner of a reference box (e.g., the em-box or a bounding box) of the first character glyph 220 to the bottom-left corner of the reference box of the second character glyph 220. Thus, in this case, the TOP construction system determines the distance from the bottom-right corner of the prior character glyph 220 to the bottom-left corner of the selected character glyph 220. In some embodiments, the distance is a positive number, both because a distance function used can incorporate and absolute value and because certain ordered pairs that might otherwise yield a negative distance were discarded (i.e., by having a cost set effectively to infinity) when determining the order.

At decision block 830, the process 800 involves determining whether the distance determined at block 825 meets (e.g., equals or exceeds) a threshold distance. The threshold distance could be a system setting, or the threshold distance could be user-configurable. Generally, a smaller value of the threshold distance could lead to an increased number of clusters 710 while a larger value could lead to a decreased number of clusters 710. For instance, the threshold distance could be set based on the font family and font size, such that the threshold distance represents an amount of space that would exceed a predetermined number of whitespaces (e.g., five whitespaces) in that font family and font size.

If the distance between the selected character glyph 220 and the prior character glyph 220 in the order meets the threshold distance, then the process 800 skips ahead to block 840. However, if the distance does not meet the threshold distance, then the process 800 proceeds to block 835.

At block 835, the process 800 involves adding the selected character glyph 220 to the current cluster 710. For instance, the clustering subsystem 165 adds the character glyph 220 to the set of character glyphs 220 already added to the current cluster 710. In some embodiments, the character glyphs 220 in the cluster 710 are adjacent in the order, and the order is still applicable to such character glyphs 220. The process 800 then proceeds to decision block 850.

However, if the distance meets (e.g., equals or exceeds) the threshold distance at decision block 830, then at block 840, the process 800 involves initializing a new cluster 710, which is initially empty, and setting the new cluster 710 as the current cluster 710. At block 845, the process 800 involves adding the selected character glyph 220 to the current cluster 710, which was initialized at block 840. The process 800 then proceeds ahead to decision block 850.

At decision block 850, regardless of whether the distance met the threshold, the process 800 involves determining whether the selected character glyph 220 is the final character glyph 220 in the order, such that no other character glyphs 220 remain to be considered. If the selected character glyph 220 is not the final character glyph 220 in the order, then the process 800 returns to block 820 for another iteration of the loop.

If the selected character glyph 220 is the final character glyph 220, then at block 855, the process 800 involves outputting the set of clusters 710, where each cluster 710 includes character glyphs 220 still associated with the order. Thus, in some embodiments, process 800 concludes with the character glyphs 220 not only associated with an order, but also grouped into clusters 710.

Determining a Path for Character Glyphs

As described above with respect to FIG. 3 and FIG. 4, after determining an order for the character glyphs 220 and, in some embodiments, after determining the clusters 710, an example of the TOP construction system 100, specifically the path-fitting subsystem 170 of the TOP construction system 100, determines a path 210 for the character glyphs 220. In some embodiments, the character glyphs 220 have been divided into one or more clusters 710; for instance, there may be only a single cluster 710 if the TOP construction system 100 decided not to split any adjacent character glyphs 220 across different cluster 710 or if the TOP construction system 100 did not attempt to group the character glyphs 220 into multiple clusters 710 (e.g., if the process 800 of FIG. 8 is not performed). For each cluster 710, the TOP construction system 100 fits a respective path 210.

In some embodiments, the path 210 fit to the character glyphs 220 in a cluster 710 is a combination of multiple curves. Specifically, the TOP construction system 100 fits a curve between each pair of adjacent glyphs 220 in the order, such that each such curve leads from one character glyph 220 to the next one in the order. For example, each such curve could be a Kappa curve or a Bezier curve, such as a quadratic or cubic Bezier curve.

Figure 9:
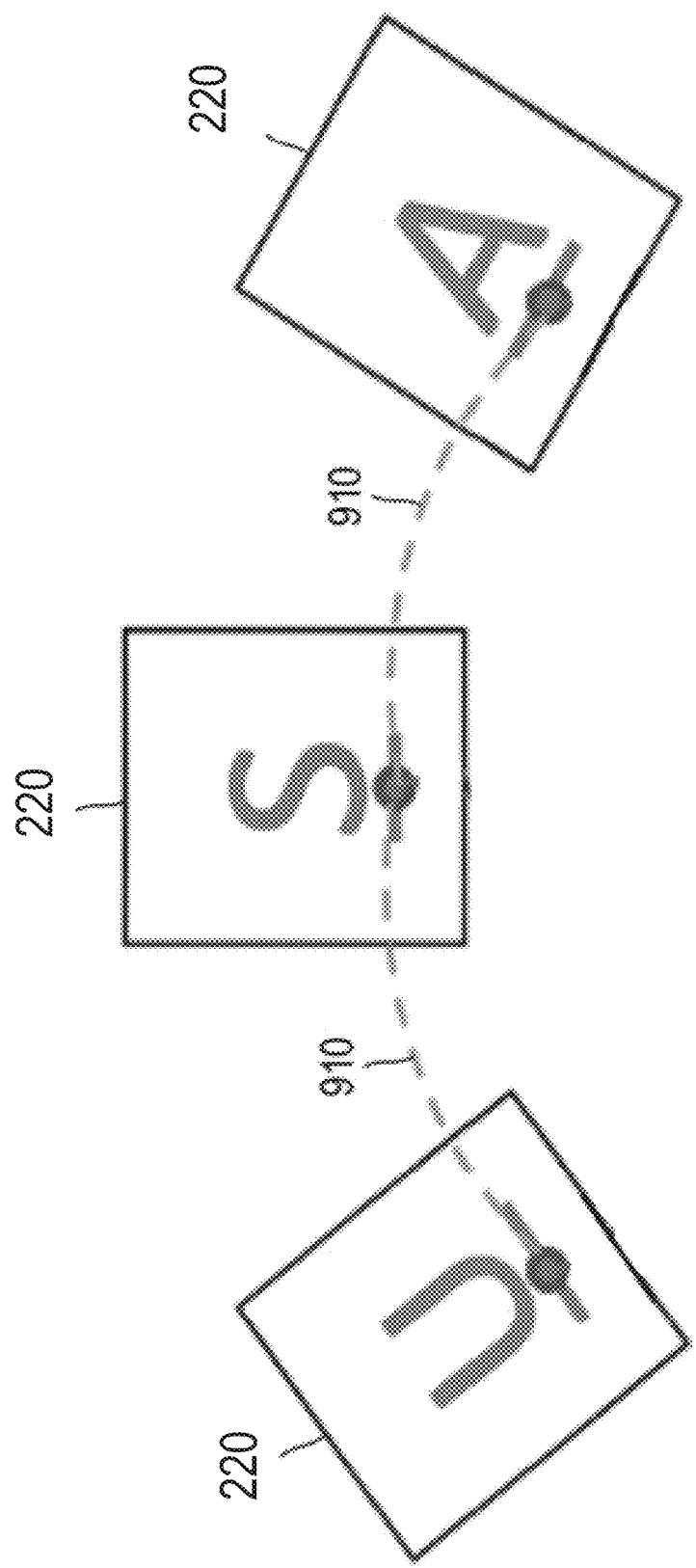
FIG. 9 shows an example of fitting Kappa curves between adjacent character glyphs in the order, according to some embodiments described herein.

FIG. 9 shows an example of fitting Kappa curves 910 between adjacent character glyphs 220 in the order, according to some embodiments described herein. In some embodiments, for each pair of adjacent character glyphs 220, the path-fitting subsystem 170 of the TOP construction system 100 generates a Kappa curve 910 connecting a first character glyph 220 to a second character glyph 220 such that the Kappa curve 910 extends from a center of a baseline of the first character glyph 220 to the center of the baseline of the second character glyph 220. Specifically, in the example of FIG. 9, the path-fitting subsystem 170 generates a Kappa curve 910 from the center of the baseline of the character glyph U to center of the baseline of the character glyph S, and the path-fitting subsystem 170 generates another Kappa curve 910 from the center of the baseline of the character glyph S to the center of the baseline of the character glyph A. In some embodiments, the TOP constructions system 100 generates the path 210 as a union of the various Kappa curves 910 between adjacent character glyphs 220.

Figure 10:
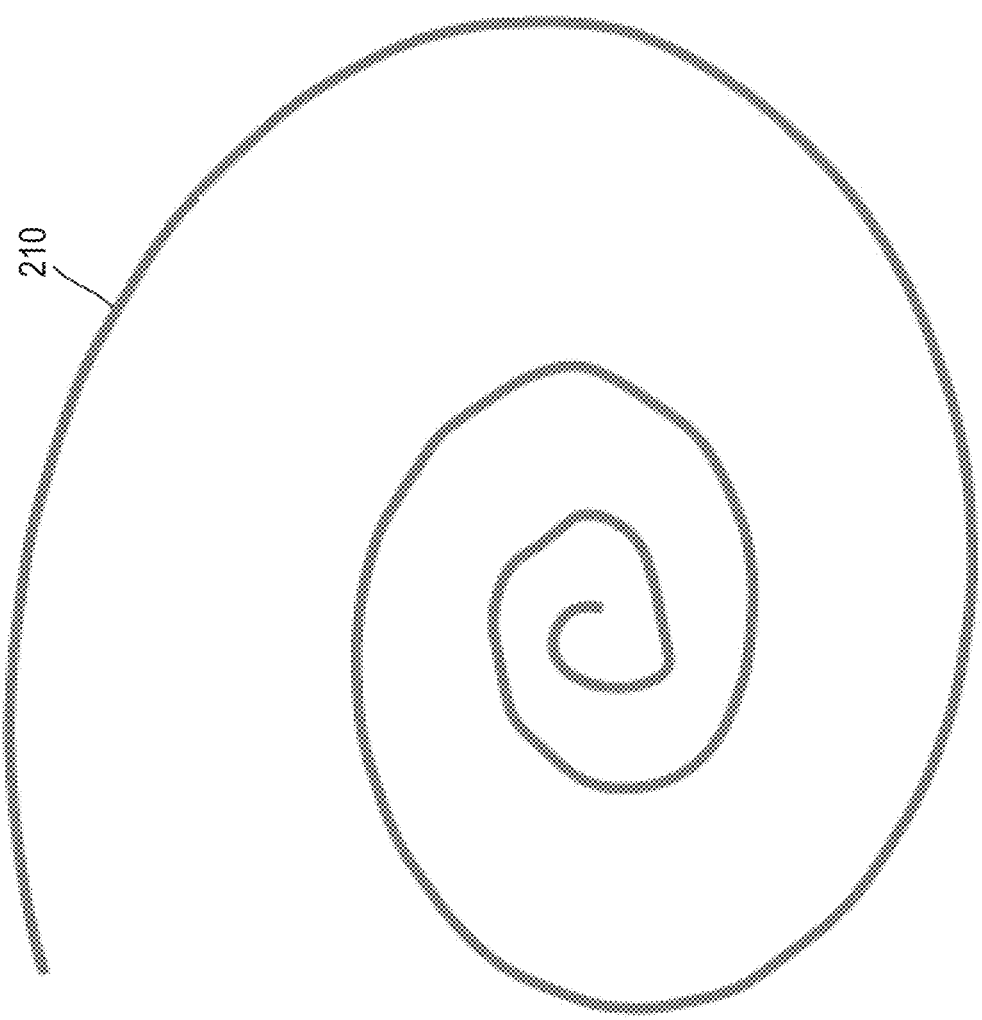
FIG. 10 shows an example of a path generated based on Kappa curves, according to some embodiments described herein.

FIG. 10 shows an example of a path 210 generated based on Kappa curves 910 as described above, according to some embodiments described herein. As shown in this example, the Kappa curves 910 form a path 210 that follows the positions of the character glyphs 220. However, the path 210 is not smooth but, rather, has bulges and sharp edges.

Figure 11:
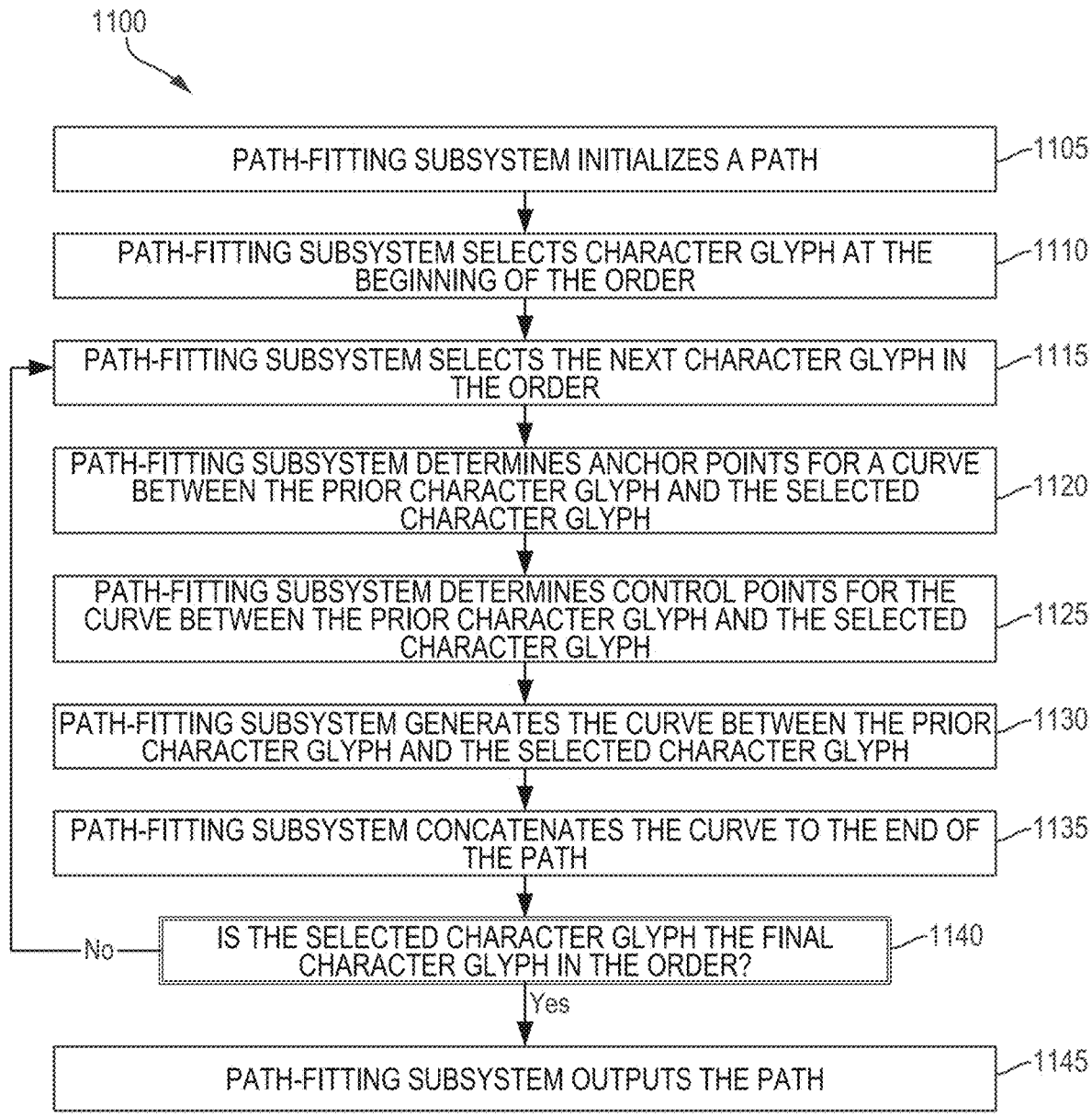
FIG. 11 is a diagram of a process of generating a path based on Bezier curves, as performed by a path-fitting subsystem of the TOP construction system, according to some embodiments described herein.

FIG. 11 is a diagram of a process 1100 of generating a path 210 based on Bezier curves, according to some embodiments described herein. In some embodiments, the path-fitting subsystem 170 of the TOP construction system 100 generates a respective curve (e.g., a Bezier curve) to connect each pair of adjacent character glyphs 220 in the order, and the resulting path 210 is a union of such curves. In some embodiments, the path-fitting subsystem 170 performs this process 1100 or similar to generate a path 210 for the character glyphs 220 from the text pieces, based on the order of character glyphs 220. More specifically, an embodiment of the path-fitting subsystem 170 performs this process 1100 or similar for each cluster 710 individually to generate a respective path 210 for the character glyphs 220 of the cluster 710. Thus, in some embodiments, this process 1100 or similar is performed a quantity of times equal to the quantity of clusters 710 for the character glyphs 220.

The process 1100 depicted in FIG. 11, as well as other processes described herein, may be implemented in software (e.g., as code, instructions, or programs) executed by one or more processing units (e.g., processors or processor cores), in hardware, or combinations thereof. The software may be stored on a non-transitory storage medium, such as on a memory device. The process 1100 depicted in FIG. 11 and described below is intended to be illustrative and non-limiting. Although FIG. 11 depicts various activities occurring in a particular sequence or order, this is not intended to be limiting. In certain embodiments, for instance, the activities may be performed in a different order, or one or more activities of the process 1100 may be performed in parallel. In certain embodiments, the process 1100 may be performed by the path-fitting subsystem 170 of the TOP construction system 100.

As shown in FIG. 11, at block 1105, the process 1100 involves initializing a path 210. In some embodiments, to initialize the path 210, the path-fitting subsystem 170 generates an empty path 210 that includes no curves. For instance, the empty path 210 could be represented as a null set. At block 1110, the process 1100 involves selecting the character glyph 220 that is first in the order determined for the character glyphs 220 in the cluster 710 for which a path 210 is being generated. If the character glyphs 220 were not divided into clusters 710, then an embodiment deems the character glyphs 220 to belong to a single cluster 710.

Block 1115 begins a loop. In each iteration of the loop, a character glyph 220 is selected, and a curve is generated between the selected character glyph 220 and the prior character glyph 220 in the order. Specifically, at block 1115, the process 1100 involves incrementing to the next character glyph 220 in the order, such that the next character glyph 220 becomes the selected character glyph 220.

At block 1120, the process 1100 involves determining the anchor points (i.e., endpoints) for a curve to be drawn (i.e., generated) between the selected character glyph 220 and the prior character glyph 220 in the order. In some embodiments, the path-fitting subsystem 170 selects as a first anchor point the center of the baseline of the prior character glyph 220, and the path-fitting subsystem 170 selects as a second anchor point the center of the baseline of the selected character glyph 220. The curve being drawn will extend from the first anchor point to the second anchor point.

At block 1125, the process 1100 involves determining control points for the curve to be drawn. In some embodiments, the path-fitting subsystem 170 seeks to generate a cubic Bezier curve between the prior character glyph 220 and the selected character glyph 220, and thus, two control points are determined because a cubic Bezier curve has two control points. For instance, an example of the path-fitting subsystem 170 selects as a first control point the point where the baseline of the prior character glyph 220 intersects with the right side of the reference box of the prior character glyph 220 and, further, selects as a second control point the point where the baseline of the selected character glyph 220 intersects with the left side of the reference box of the selected character glyph 220.

Figure 12:
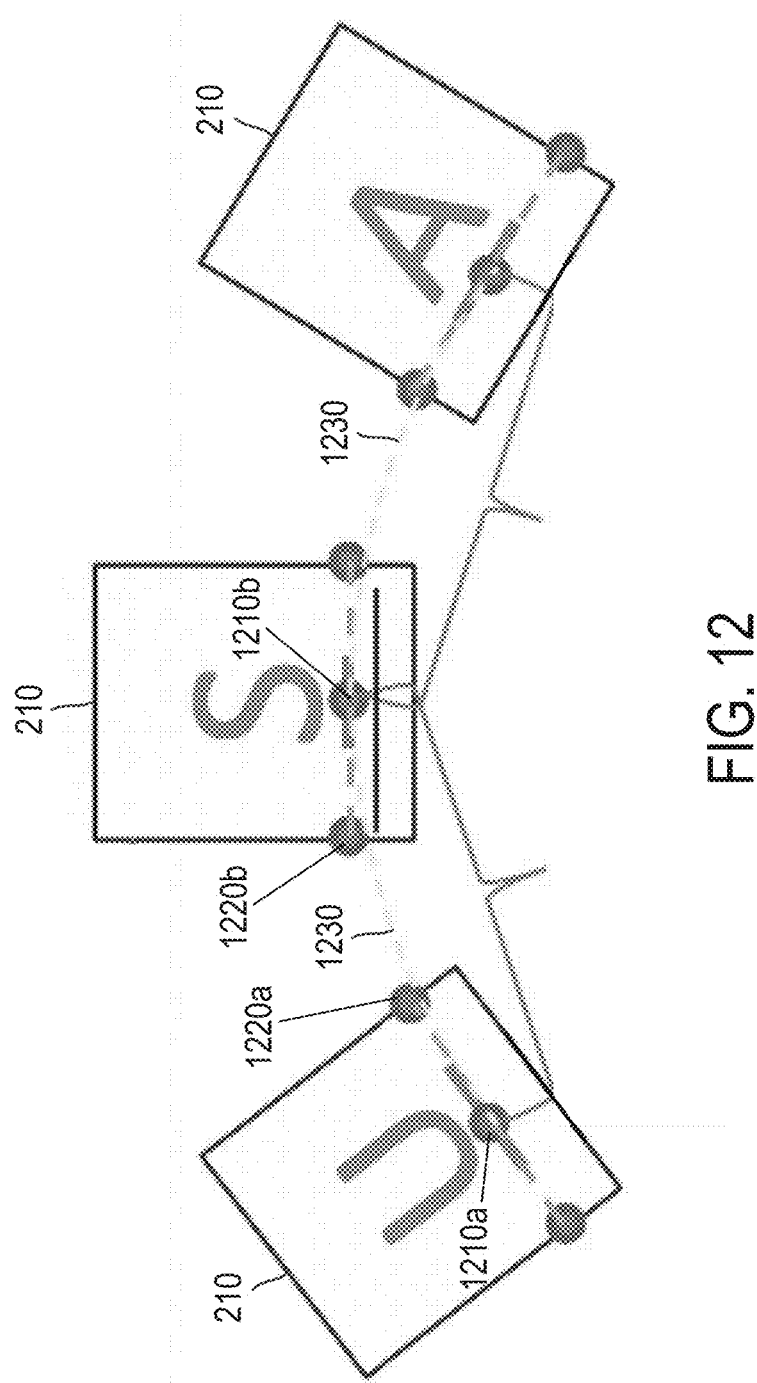
FIG. 12 shows an example of adjacent character glyphs for which curves are to be generated during construction of a path, according to some embodiments described herein.

FIG. 12 shows an example of adjacent character glyphs 220 for which curves, specifically Bezier curves 1230, are to be generated, according to some embodiments described herein. Specifically, the example of FIG. 12 illustrates three character glyphs, U, S, and A. According to the order of the character glyphs 220 as previously determined for this example, the character glyphs 220 are ordered (U, S, A) such that the U is adjacent to the S, which is adjacent to the A. For a Bezier curve 1230 to be generated between the character glyphs U and S, this example illustrates the first anchor point 1210a and the second anchor point 1210b, which are respectively located at the center of the baselines of the character glyph U and the character glyph S. Additionally, FIG. 12 shows the first control point 1220a, which is located at the intersection of the baseline and the right side of the reference box of the character glyph U, and the second control point 1220b, which is located at the intersection of the baseline and the left side of the reference box of the character glyph S.

Returning back to FIG. 11, at block 1130, the process 1100 involves generating a curve between the prior character glyph 220 and the selected character glyph 220 based on the anchor points determined at block 1120 and the control points determined at block 1125. For instance, an embodiment of the path-fitting subsystem 170 determines a curve that has the first anchor point and the second anchor point as anchor points and has the first control point and the second control point as control points. In some embodiments, because the first anchor point and the second anchor point are located at the center of the respective baselines of the prior character glyph 220 and the selected character glyph 220, this curve connects the prior character glyph 220 to the selected character glyph 220.

At block 1135, the process 1100 involves concatenating to the end of the path 210 the curve generated at block 1130. Thus, if the path 210 is currently empty, then the curve becomes the full path 210 for the time being. However, if the path 210 already includes one or more curves, then an embodiment of the path-fitting subsystem 170 adds the curve generated at block 1130 to the one or more curves previously generated and added to the path 210.

At decision block 1140, the process 1100 involves determining whether the selected character glyph 220 is the final character glyph 220 in the order for the cluster 710 for which a path 210 is being generated. If the selected character glyph 220 is not the final character glyph 220 in the order for the cluster 710, then the process 1100 returns to block 1115 to select another character glyph 220. However, if the selected character glyph 220 is the final character glyph 220 in the order for the cluster 710, then at block 1145, the process 1100 involves outputting the path 210 generated for the cluster 710.

Figure 13:
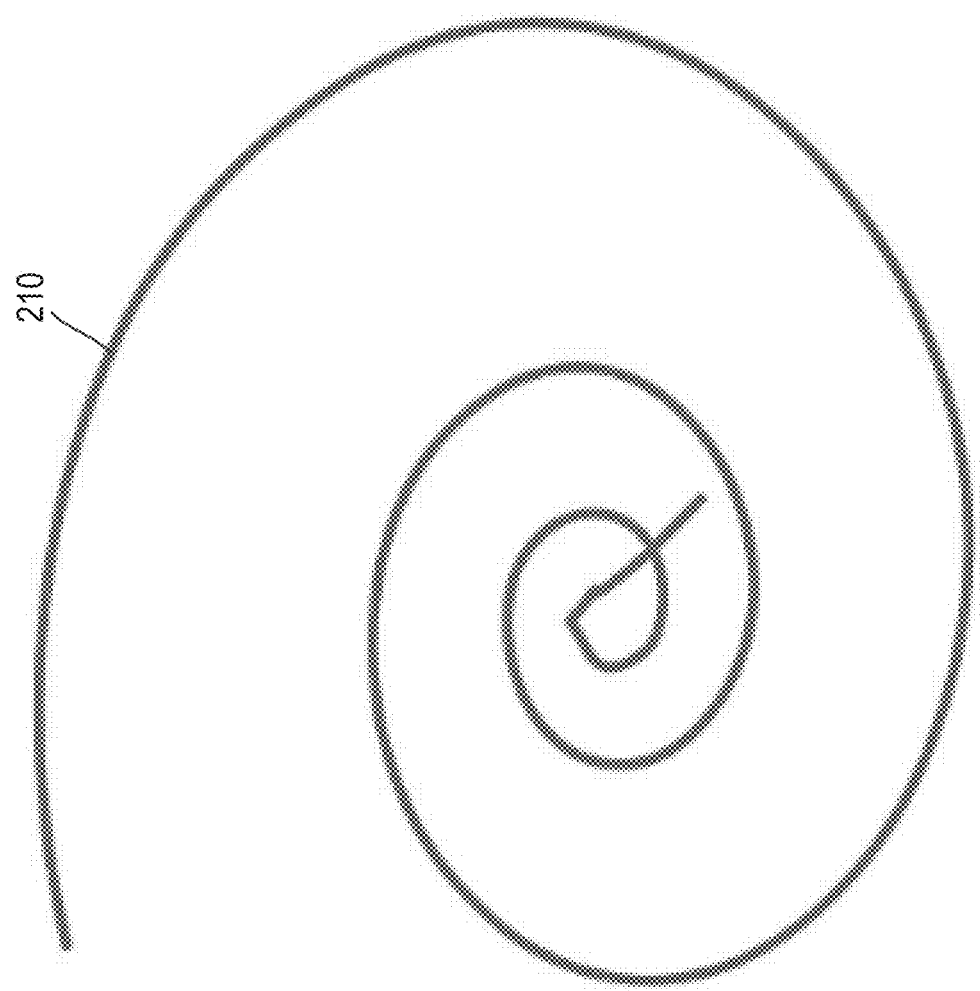
FIG. 13 is an example of a path generated based on Bezier curves, according to some embodiments described herein.

FIG. 13 is an example of a path 210 resulting from generating Bezier curves 1230, as in the above process 1100, according to some embodiments described herein. As shown in FIG. 13, the path 210 is smoother than the example of FIG. 10, which is based on Kappa curves 910, but the path 210 still includes smaller discontinuities. Some embodiments described herein can improve this result even further through strategic selection of the control points used in each curve.

Analytically, it has been observed that natural-looking (i.e., smooth) Bezier curves 1230 tend to have almost equal distances between (a) a first anchor point and a first control point, (b) the first control point and a second control point, and (c) the second control point and a second anchor point. As described below, some embodiments utilize a search technique, specifically a binary search technique, to identify control points that cause these distances to be approximately equal (e.g., equal within a tolerance).

Figure 14A:
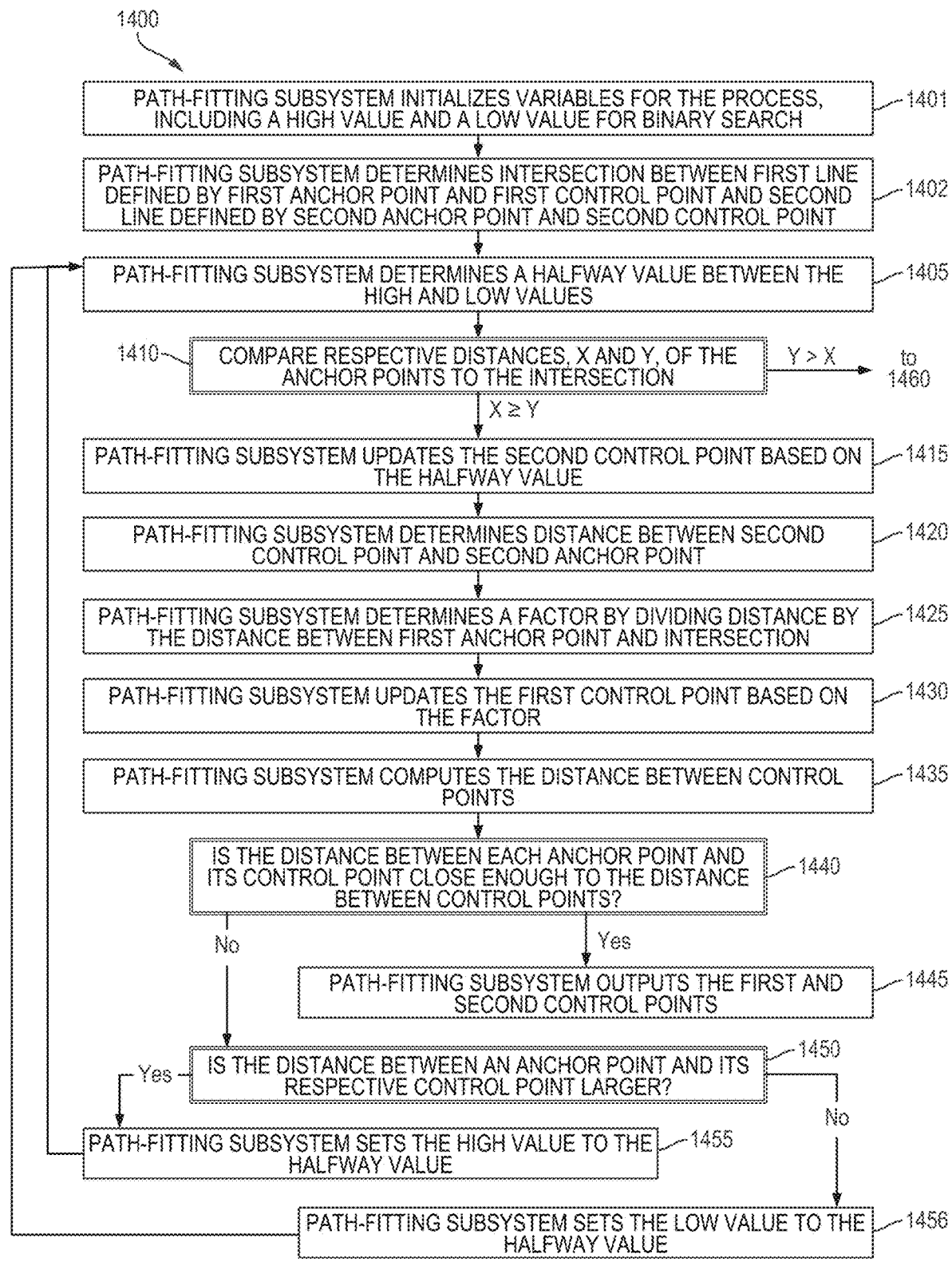
FIG. 14A is part of a diagram of a process of determining control points for a curve between adjacent character glyphs, as performed by the path-fitting subsystem of the TOP construction system, according to some embodiments described herein.
Figure 14B:
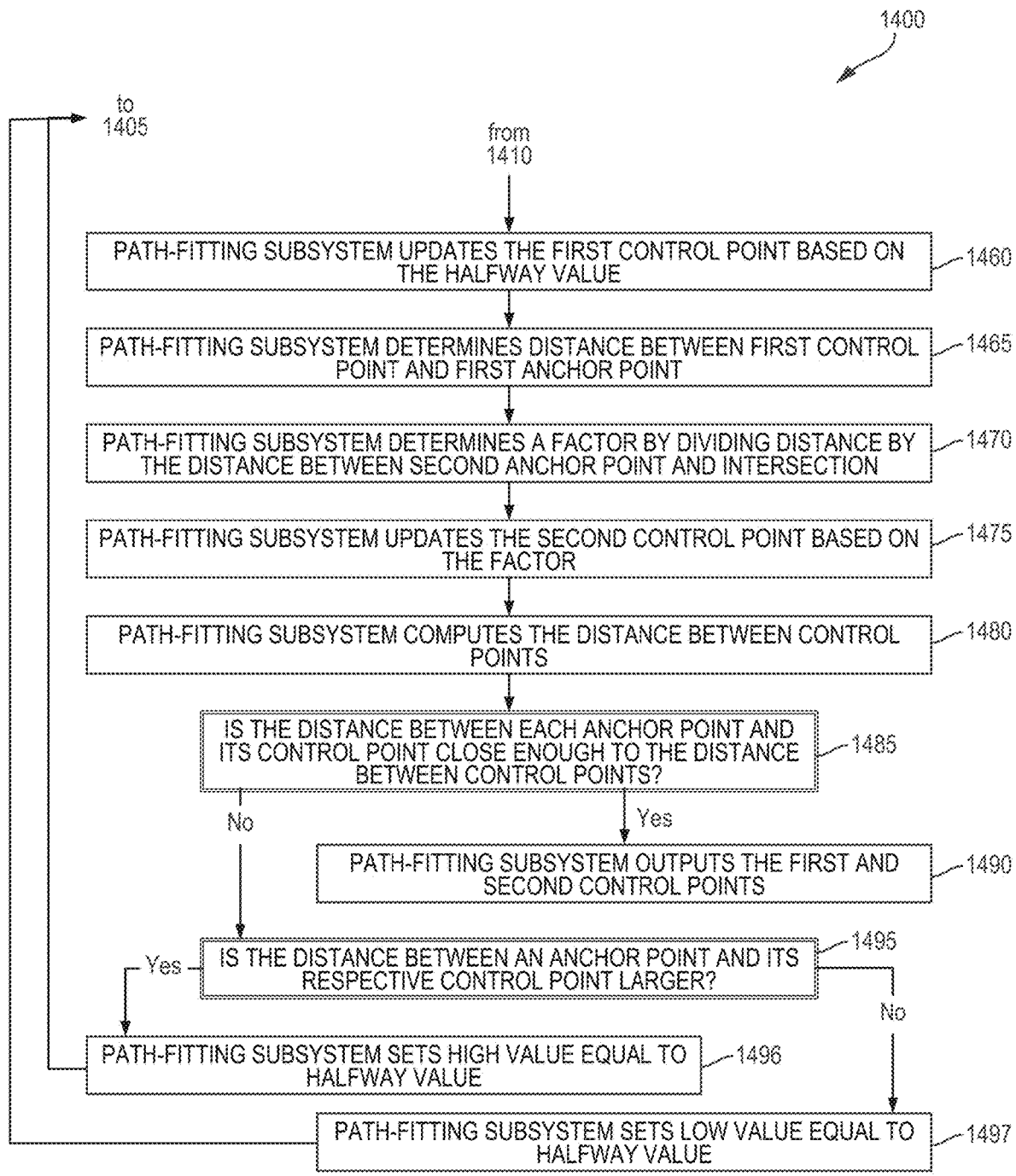
FIG. 14B is another part of the diagram of the process of determining control points for a curve between adjacent character glyphs, as performed by the path-fitting subsystem of the TOP construction system, according to some embodiments described herein.

FIG. 14A and FIG. 14B together form a diagram of a process 1400 of selecting control points for a curve between adjacent character glyphs 220, according to some embodiments described herein. In some embodiments, the path-fitting subsystem 170 of the TOP construction system 100 performs this process 1400 or similar to determine control points at block 1125 of the above process 1100 for generating a path 210. Thus, the process 1400 takes as input a first character glyph 220 and a second character glyph 220 that have been determined to be adjacent according to the order, and the process 1400 outputs a first control point and a second control point to be used as a basis for a curve between the first character glyph 220 and the second character glyph 220.

The process 1400 depicted in FIGS. 14A-14B, as well as other processes described herein, may be implemented in software (e.g., as code, instructions, or programs) executed by one or more processing units (e.g., processors or processor cores), in hardware, or combinations thereof. The software may be stored on a non-transitory storage medium, such as on a memory device. The process 1400 depicted in FIGS. 14A-14B and described below is intended to be illustrative and non-limiting. Although FIGS. 14A-14B depict various activities occurring in a particular sequence or order, this is not intended to be limiting. In certain embodiments, for instance, the activities may be performed in a different order, or one or more activities of the process 1400 may be performed in parallel. In certain embodiments, the process 1400 may be performed by the path-fitting subsystem 170 of the TOP construction system 100.

As shown in FIG. 14A, at block 1401, variables are initialized for use in the process 1400. In some embodiments, for instance, the path-fitting subsystem 170 sets the variables low and high, such that low=0 and high=1. These variables may be used as starting points for determining control points.

At block 1402, the process 1400 involves determining an intersection between (a) a first line defined by the first anchor point (e.g., the center of the baseline of the first character glyph 220) and the first control point and (b) a second line defined by the second control point and the second anchor point (e.g., the center of the baseline of the second character glyph 220). As described below, this intersection stays constant throughout the process 1400 and provides a guidance in determining updated values for the first control point and the second control point.

Figure 15:
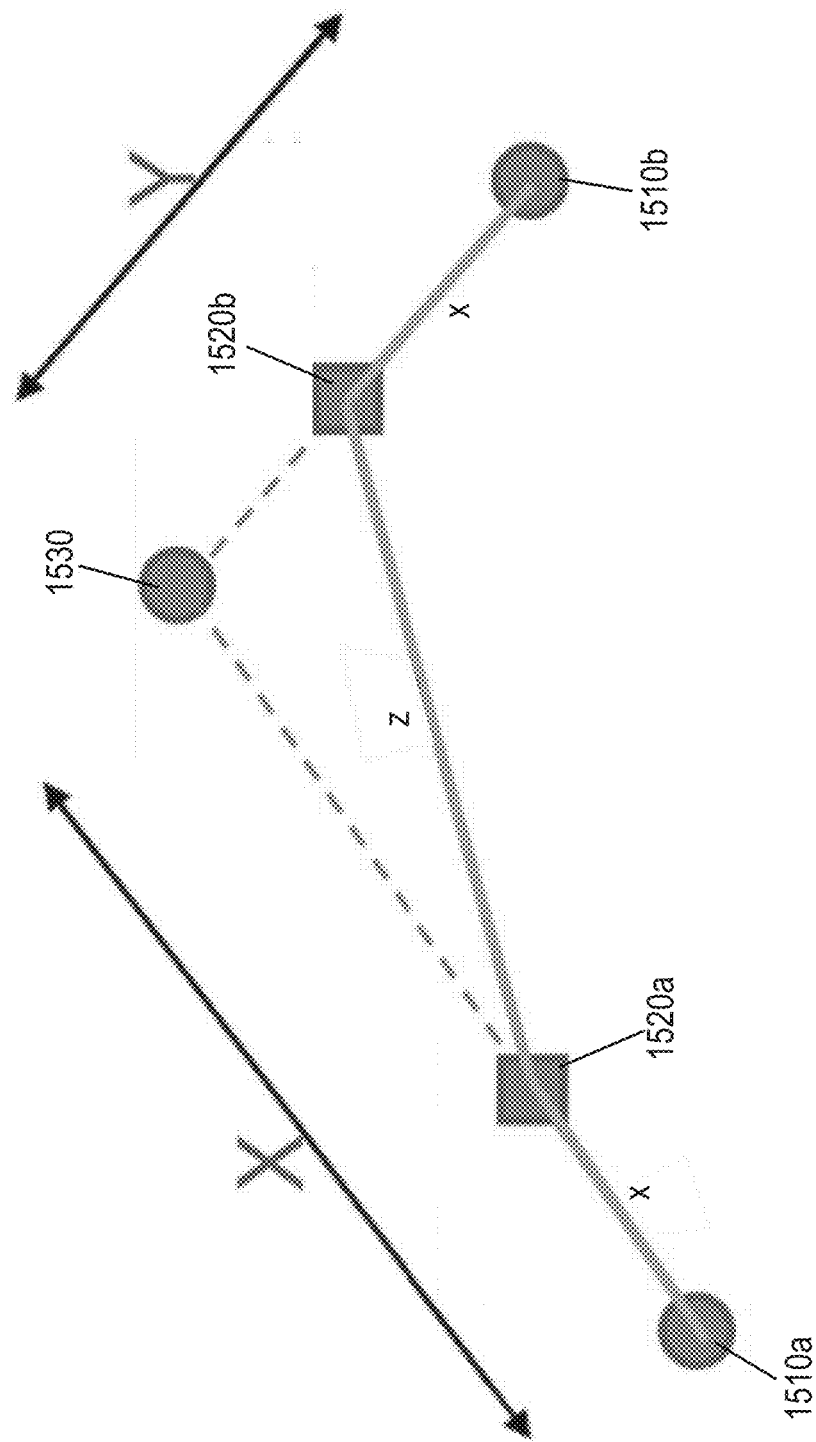
FIG. 15 shows an example of various reference values used in a process of determining control points for a curve, according to some embodiments described herein.

FIG. 15 shows an example of various reference values used in the process 1400 of determining control points, according to some embodiments described herein. For instance, FIG. 15 illustrates the first anchor point 1510a and the second anchor point 1510b, which may be the centers of the baselines of the first character glyph 220 and the second character glyph 220 respectively. FIG. 15 also shows the first control point 1520a and the second control point 1520b, which are updatable as the process 1400 continues.

As shown in FIG. 15, the first anchor point 1510a and the first control point 1520a define a first line that extends to an intersection 1530, and the second control point 1520b and the second anchor point 1510b define a second line that extends to the intersection. Thus, the first line and the second line meet at the intersection 1530. The distance between the first anchor point 1510a and the intersection 1530 is X, and the distance between the second anchor point 1510b and the intersection 1539 is Y.

Additionally, as shown in FIG. 15, there is a distance x between the first anchor point 1510a and the first control point 1520a, and there is that same distance x between the second control point 1520b and the second anchor point 1510b. There is a distance z between the first control point 1520a and the second control point 1520b. Some embodiments of the process 1400 for determining control points seek to determine positions of the first control point 1520a and the second control point 1520b such that x is approximately equal to z.

Returning to FIG. 14A, at block 1405, the process 1400 involves determining the value of a halfway value, mid=(high+low)/2, which is halfway between a highest factor being considered for placement of control points and a lowest factor being considered for placement of the control points. As mentioned above, this process utilizes a binary search technique, specifically, to select control points from control point candidates lying between the first anchor point and the intersection and between the second anchor point and the intersection. Thus, an embodiment utilizes the value of mid to divide the remaining search area, either X or Y, in half so as to continue searching for appropriate control points.

At decision block 1410, the process 1400 involves comparing the following values: (a) X, which is the distance between the first anchor point and the intersection determined at block 1402 and (b) Y, which us the distance between the second anchor point and the intersection determined at block 1402. If X≥Y, then the process 1400 proceeds to block 1415. However, if Y>X, then the process 1400 skips ahead to block 1460. Based on this comparison, the process 1400 determines which control point to consider first.

At block 1415, the process 1400 involves updating the second control point 1520b based on the halfway value. For instance, the second control point 1520b could be set to a computed point, based on the halfway value, along the line between the second anchor point 1510b and the intersection 1530. Specifically, an embodiment of the path-fitting subsystem 170 sets the second control point 1520b to a position on the line such that the distance along the line from the second anchor point 1510b toward the intersection 1530 is equal to mid multiplied by the length of Y. In some embodiments, because low was initialized to 0 and high was initialized to 1, mid is a value between 0 and 1, and thus, the second control point 1520b is updated to a point between the second anchor point 1510b and the intersection 1530.

At block 1420, the process 1400 involves determining the value of x, which is the distance between the second control point 1520b and the second anchor point 1510b. At block 1425, the process 1400 involves dividing the distance x determined at block 1420 by the distance X between the first anchor point 1510a and the intersection 1530. The resulting quotient, factor t=x/X, represents how far along the line segment between the first anchor point 1510a and the intersection 1530 the first control point 1520a would be set, given the value of x as the distance between the first anchor point 1510a and the first control point 1520a.

At block 1430, the process 1400 involves updating the position of the first control point 1520a based in the factor t. For instance, an embodiment of the path-fitting subsystem 170 determines for the first control point 1520a a point that is on the line between the first anchor point 1510a and the intersection 1530 and has a distance from the first anchor point 1510a that is t multiplied by X.

At block 1435, the process 1400 involves computing the value of z, which is the distance between the first control point 1520a, determined at block 1430, and the second control point 1520b, determined at block 1415.

At decision block 1440, the process 1400 involves determining whether the distance between anchor points and their respective control points is close enough to the distance between control points. Specifically, an embodiment determines whether |x−z| is within than a tolerance. If the distances are deemed close enough, then at block 1445, the process 1400 involves outputting the first control point 1520a and the second control point 1520b as the determined control points for a curve and then ending the process 1400. However, if the distances are not close enough, then the process 1400 proceeds to decision block 1450.

At decision block 1450, the process 1400 involves determining whether x, the distance between each anchor point and its respective control point, is greater than z, the distance between the two control points. If x is greater, then at block 1455, the value of high is updated such that high=mid, and the process 1400 then returns to block 1405 to further refine the positions of the control points. However, if x is not greater than z, then at block 1456, the process 1400 involves setting the value of low such that low=mid, and the process 1400 then returns to block 1405 to further refine the positions of the control points.

As mentioned above, if Y>X at decision block 1410, then the process jumped ahead to block 1460. Block 1460 begins a series of various activities described above except the first control point 1520a is updated before the second control point 1520. Thus, an embodiment of the path-fitting subsystem 170 adjusts the position of the control point on the smaller of the two line segments, of a first line segment between the first anchor point 1510a and the intersection 1530 and a second line segment between the second anchor point 1510b and the intersection 1530, and then adjusts the position of the control point on the larger of those two line segments.

Referring to FIG. 14B, at block 1460, the process 1400 involves updating the first control point 1520a based on the halfway value. For instance, the first control point 1520a could be set to a computed point, based on the halfway value, along the line between the first anchor point 1510a and the intersection 1530. Specifically, an embodiment of the path-fitting subsystem 170 sets the first control point 1520a to a position on the line such that the distance along the line from the first anchor point 1510a toward the intersection 1530 is equal to mid multiplied by the length of X. In some embodiments, because low was initialized to 0 and high was initialized to 1, mid is a value between 0 and 1, and thus, the first control point 1520a is updated to a point between the first anchor point 1510a and the intersection 1530.

At block 1465, the process 1400 involves determining the value of x, which is the distance between the first control point 1520a and the first anchor point 1510a. At block 1470, the process 1400 involves dividing the distance x determined at block 1420 by the distance Y between the second anchor point 1510b and the intersection 1530. The resulting quotient, factor t=x/Y, represents how far along the line segment between the second anchor point 1510b and the intersection 1530 the second control point 1520b would be set, given the value of x as the distance between the second anchor point 1510b and the second control point 1520b.

At block 1475, the process 1400 involves updating the position of the second control point 1520b based in the factor t. For instance, an embodiment of the path-fitting subsystem 170 determines for the second control point 1520b a point that is on the line between the second anchor point 1510b and the intersection 1530 and has a distance from the second anchor point 1510b that is t multiplied by Y.

At block 1480, the process 1400 involves computing the value of z, which is the distance between the second control point 1520b, determined at block 1475, and the first control point 1520a, determined at block 1460.

At decision block 1485, the process 1400 involves determining whether the distance between anchor points and their respective control points is close enough to the distance between control points. Specifically, an embodiment determines whether |x−z| is within than a tolerance. If the distances are deemed close enough, then at block 1490, the process 1400 involves outputting the first control point 1520a and the second control point 1520b as the determined control points for a curve and then ending the process 1400. However, if the distances are not close enough, then the process 1400 proceeds to decision block 1495.

At decision block 1495, the process 1400 involves determining whether x, the distance between each anchor point and its respective control point, is greater than z, the distance between the two control points. If x is greater, then at block 1496, the value of high is updated such that high=mid, and the process 1400 then returns to block 1405 to further refine the positions of the control points. However, if x is not greater than z, then at block 1497, the process 1400 involves setting the value of low such that low=mid, and the process 1400 then returns to block 1405 to further refine the positions of the control points.

Figure 16:
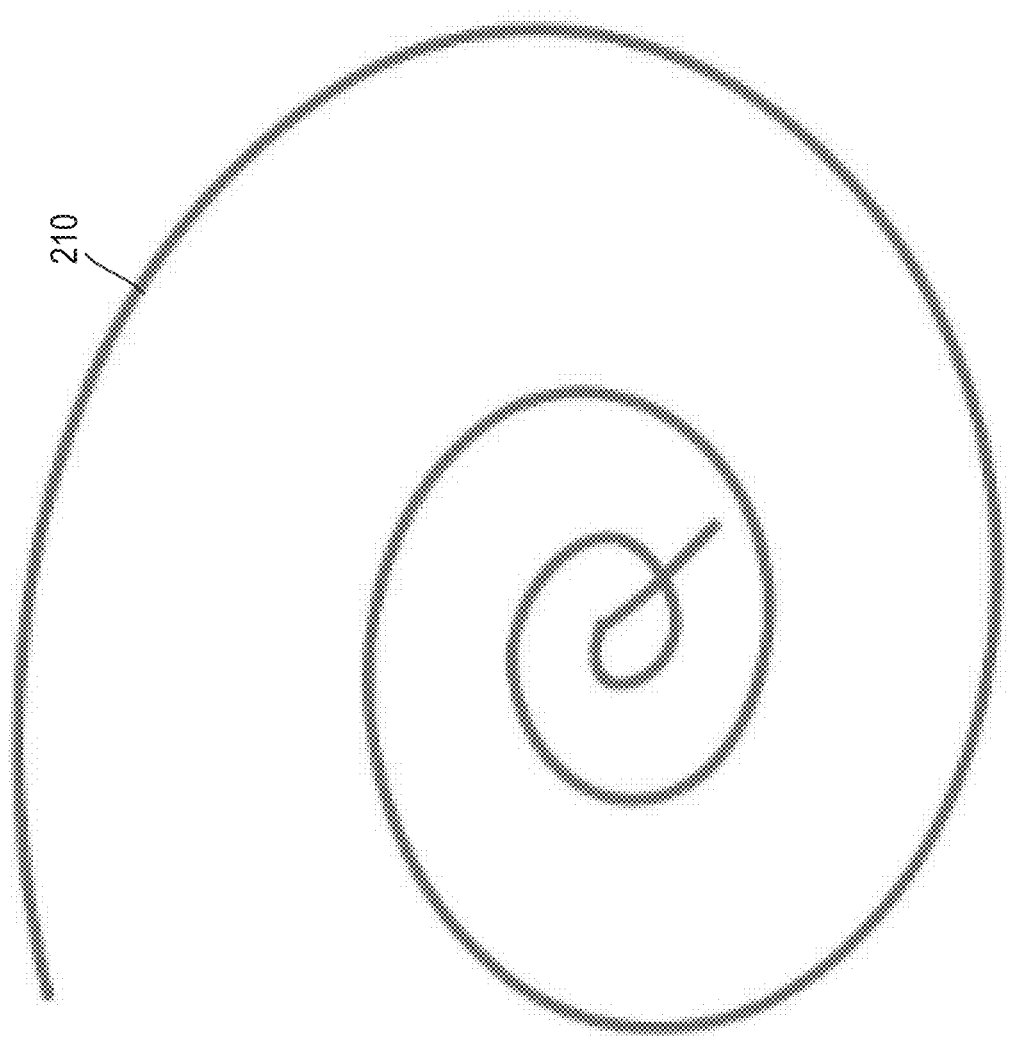
FIG. 16 shows an example of a path generated based on Bezier curves, where the control points of each curve are strategically determined, according to some embodiments described herein.

FIG. 16 shows an example of a path 210 resulting from generating Bezier curves 1230 between adjacent character glyphs 220, where the control points of each curve were strategically computed as in the process 1400 described above. As is apparent from comparing the path 210 of FIG. 16 with the paths 210 of FIG. 13 and FIG. 10, the TOP construction system 100 can generate a smooth curve with few to no discontinuities when using this process 1400 or similar such that the distances between (a) the first anchor point and the first control point, (b) the first control point and the second control point, and (c) the second control point and the second anchor point are approximately equal (e.g., within a tolerance).

As described above with respect to FIG. 3 and FIG. 4, after determining the path 210, some embodiment of the TOP construction system 100 position character glyphs 220 along the path 210. For instance, the TOP construction system 100 can adjust the positions of one or more character glyphs 220 along the path 210. In some embodiments, before or after positioning the character glyphs 220 as described below in detail, the TOP construction system 100 simplifies the path 210. As described in detail above, a path 210 can be generated with one respective anchor point corresponding to each character glyph 220; however, this can make editing the path 210 difficult for a user given the potentially large quantity of anchor points and thus curves making up the path 210. To ease path editing, some embodiments use a simplification technique to reduce the number of anchor points in the path 210 while maintaining the aesthetics of the path 210.

Figure 17:
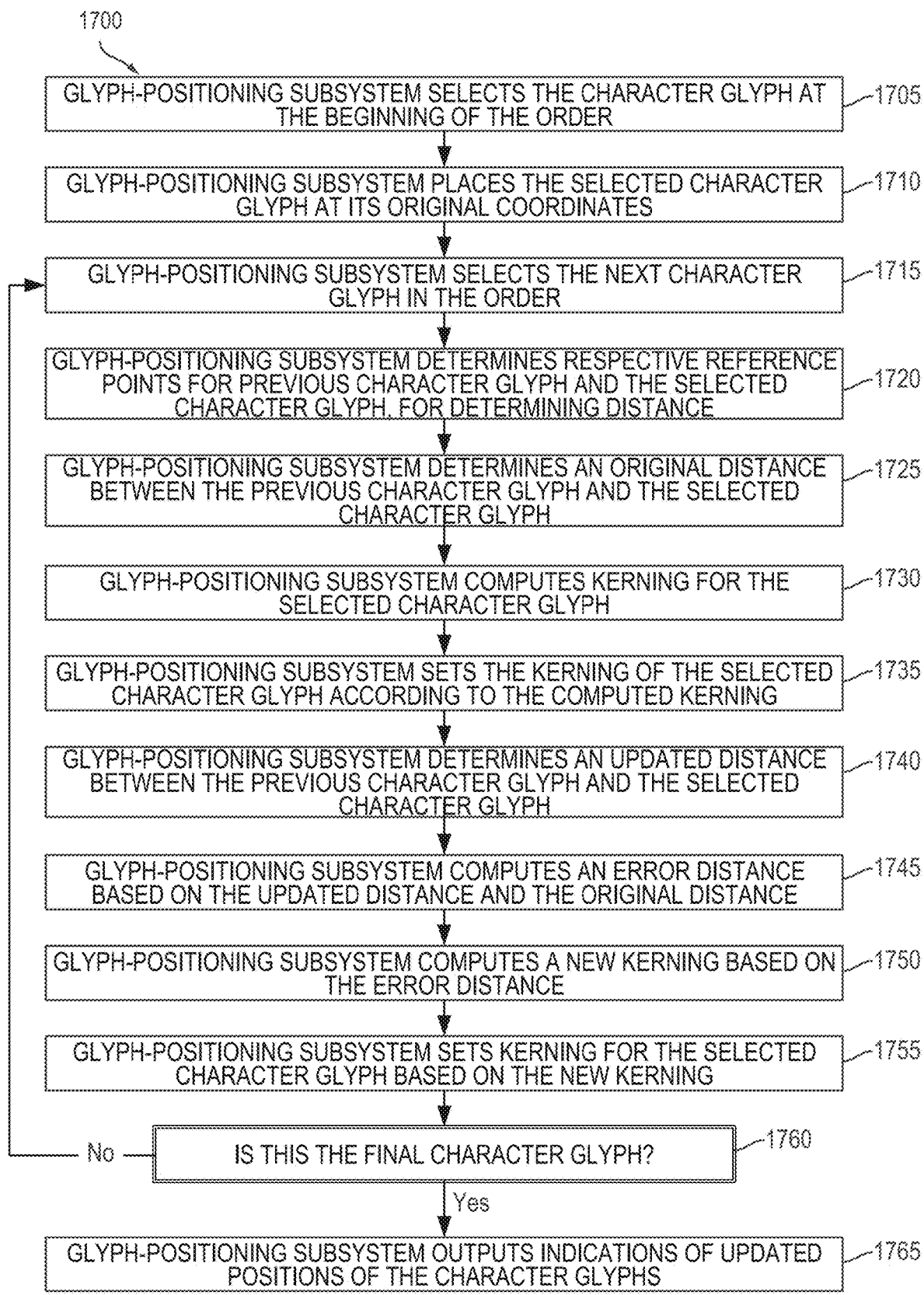
FIG. 17 is a diagram of a process of positioning character glyphs on the path generated for those character glyphs, as performed by a glyph-positioning subsystem of the TOP construction system, according to some embodiments described herein.

FIG. 17 is a diagram of a process 1700 of positioning character glyphs 220 on the path 210 generated for those character glyphs 220, according to some embodiments described herein. In some embodiments, the glyph-positioning subsystem 180 of the TOP construction system 100 uses this process 1700 or similar to arrange (e.g., rearrange) character glyphs 220 of a cluster 710 along the path 210 specifically generated for that cluster 710. This process 1700 can be beneficial, for instance, because some applications do not read whitespaces when scanning a digital or paper document. Indeed, in some cases, text pieces provided by an OCR system can include overlapping character glyphs 220 that are potentially unreadable. In short, the character glyphs 220 may not have an appropriate or even amount of space between them. This process 1700 or similar can space the character glyphs 220 appropriately. This process 1700 or similar may be performed for each path 210 and, thus, for each cluster 710 of the character glyphs 220. As discussed above, if the TOP construction system 100 did not identify multiple clusters 710 of the character glyphs 220, the character glyphs 220 can be deemed to belong to a single cluster 710.

The process 1700 depicted in FIG. 17, as well as other processes described herein, may be implemented in software (e.g., as code, instructions, or programs) executed by one or more processing units (e.g., processors or processor cores), in hardware, or combinations thereof. The software may be stored on a non-transitory storage medium, such as on a memory device. The process 1700 depicted in FIG. 17 and described below is intended to be illustrative and non-limiting. Although FIG. 17 depicts various activities occurring in a particular sequence or order, this is not intended to be limiting. In certain embodiments, for instance, the activities may be performed in a different order, or one or more activities of the process 1700 may be performed in parallel. In certain embodiments, the process 1700 may be performed by the glyph-positioning subsystem 180 of the TOP construction system 100.

As shown in FIG. 17, at block 1705, the process 1700 involves selecting the character glyph 220 at the beginning of the order determined above for the character glyphs 220 in a current cluster 710. At block 1710, the process 1700 involves positioning the selected character glyph 220 (i.e., the first character glyph 220 in the order) at its original coordinates.

Block 1715 begins a loop in which, during each iteration a character glyph 220 is placed (i.e., positioned) based on the original position of the character glyph 220 and further based on a desired kerning and a computed error. Specifically, at block 1715, the process 1700 involves selecting the next character glyph 220 in the order.

At block 1720, the process 1700 involves determining a reference point for the position of previous character glyph 220 and a reference point for the position of the selected character glyph 220. In some embodiments, the glyph-positioning subsystem 180 sets the reference point for the position of the previous character glyph 220 to the intersection between the baseline of the previous character glyph 220 and the reference box of the previous character glyph 220. Further, the glyph-positioning subsystem 180 sets the reference point for the position of the selected character glyph 220 to the intersection of the baseline and the reference box of the selected character glyph 220.

At block 1725, the process 1700 involves determining an original distance between the previous character glyph 220 and the selected character glyph 220. For instance, an embodiment of the glyph-positioning subsystem 180 determines the distance between the respective reference points determined at block 1720 by subtracting the reference point of the previous character glyph 220 from the reference point of the selected character glyph 220. The glyph-positioning subsystem 180 then sets the original distance to this determined distance.

At block 1730, the process 1700 involves computing kerning, or a kerning value, for the selected character glyph 220. Generally, kerning is an adjustment to spacing between characters. In some embodiments, the glyph-positioning subsystem 180 computes kerning based on at least one of the original distance between the previous character glyph 220 and the selected character glyph 220, the font size of the character glyph 220, or the horizontal scale of the font applicable to the selected glyph 220. Specifically, for instance, the glyph-positioning subsystem 180 could compute the kerning as follows:

$$\text{kerning} = \frac{1000 \times \text{original\_distance}}{\text{font\_size} \times \text{horizontal\_scale}}$$

In the above formula, original_distance is the original distance between the previous character glyph 220 and the selected character glyph 220, font_size is the font size of the selected character glyph 220, and horizontal_scale is the horizontal scale of a font as applied to the selected character glyph 220.

At block 1735, the process 1700 involves setting the kerning computed in block 1730. In some embodiments, to set the kerning, the glyph-positioning subsystem 180 updates the kerning applied to the selected character glyph 220 by the value of kerning computed at block 1730. This potentially changes the position of the selected character glyph 220 and thus the spacing between the previous character glyph 220 and the selected character glyph 220. If the kerning is positive, this will adjust the position of the selected character glyph 220 to increase the space between the previous character glyph 220 and the selected character, and if the kerning is negative, this will adjust the position of the selected character glyph 220 to decrease the space between the previous character glyph 220 and the selected character glyph 220.

At block 1740, the process 1700 involves determining an updated distance, due to the kerning, between the previous character glyph 220 and the selected character glyph 220. For instance, an embodiment of the glyph-positioning subsystem 180 determines the distance between the respective reference points determined at block 1720 by subtracting the reference point of the previous character glyph 220 from the reference point of the selected character glyph 220. The glyph-positioning subsystem 180 then sets the updated distance to this determined distance.

At block 1745, the process 1700 involves computing an error distance between the updated distance and the original distance. For instance, an embodiment of the glyph-positioning subsystem 180 computes the error distance by subtracting the original distance from the updated distance. In some embodiments, the error distance is allowed to be positive or negative, so no absolute value need be applied to resulting difference.

At block 1750, the process 1700 involves computing a new kerning based on the error distance determined at block 1745. The new kerning will potentially further adjust the position of the selected character glyph 220 and thus the distance between the previous character glyph 220 and the selected character glyph 220. In some embodiments, the glyph-positioning subsystem 180 computes the new kerning based on at least one of the error distance between the previous character glyph 220 and the selected character glyph 220, the font size of the character glyph 220, or the horizontal scale of the font applicable to the selected glyph 220. Specifically, for instance, the glyph-positioning subsystem 180 could compute the new kerning as follows:

$$kerning = \frac{1000 \times error\_distance}{font\_size \times horizontal\_scale}$$

At block 1755, the process 1700 involves setting the new kerning computed in block 1750. In some embodiments, to set the new kerning, the glyph-positioning subsystem 180 updates the kerning applied to the selected character glyph 220 by adding the new kerning to the existing kerning that was set at block 1735. If the new kerning is positive, this will adjust the position of the selected character glyph 220 to increase the space between the previous character glyph 220 and the selected character, and if the new kerning is negative, this will adjust the position of the selected character glyph 220 to decrease the space between the previous character glyph 220 and the selected character glyph 220.

At decision block 1760, the process 1700 involves determining whether the selected character glyph 220 is the final character glyph 220 in the order for the cluster 710 being considered, such that no character glyph 220 follows the selected character glyph 220 in the cluster 710. If the selected character glyph 220 is not the final character glyph 220, then the process 1700 returns to block 1715 to consider and possibly adjust the position of another character glyph 220. However, if the selected character glyph 220 is the final character glyph 220 in the order for the cluster 710, the process 1700 proceeds to block 1765. At block 1765, the process 1700 involves outputting indications of the updated positions (i.e., with the kernings set as described above) of the character glyphs 220.

In some embodiments, the object-generation subsystem 190 of the TOP construction system 100 then generates a text object based on the order of the character glyphs 220, the path 210, and the updated positions of the character glyphs 220. For instance, such a text object includes all the character glyphs 220 assigned to a respective cluster 710, with each character glyph 220 of the cluster 710 positioned as determined in the above process 1700 and with the character glyphs 220 of the cluster 710 associated with the path 210 determined for that cluster 710. Due to association with the path 210, for instance, editing of the text object would occur along the path 210, and a user could adjust the path 210 to reflow the character glyphs 220 of the text object along the adjusted path 210.

Example Implementation

Figure 18:
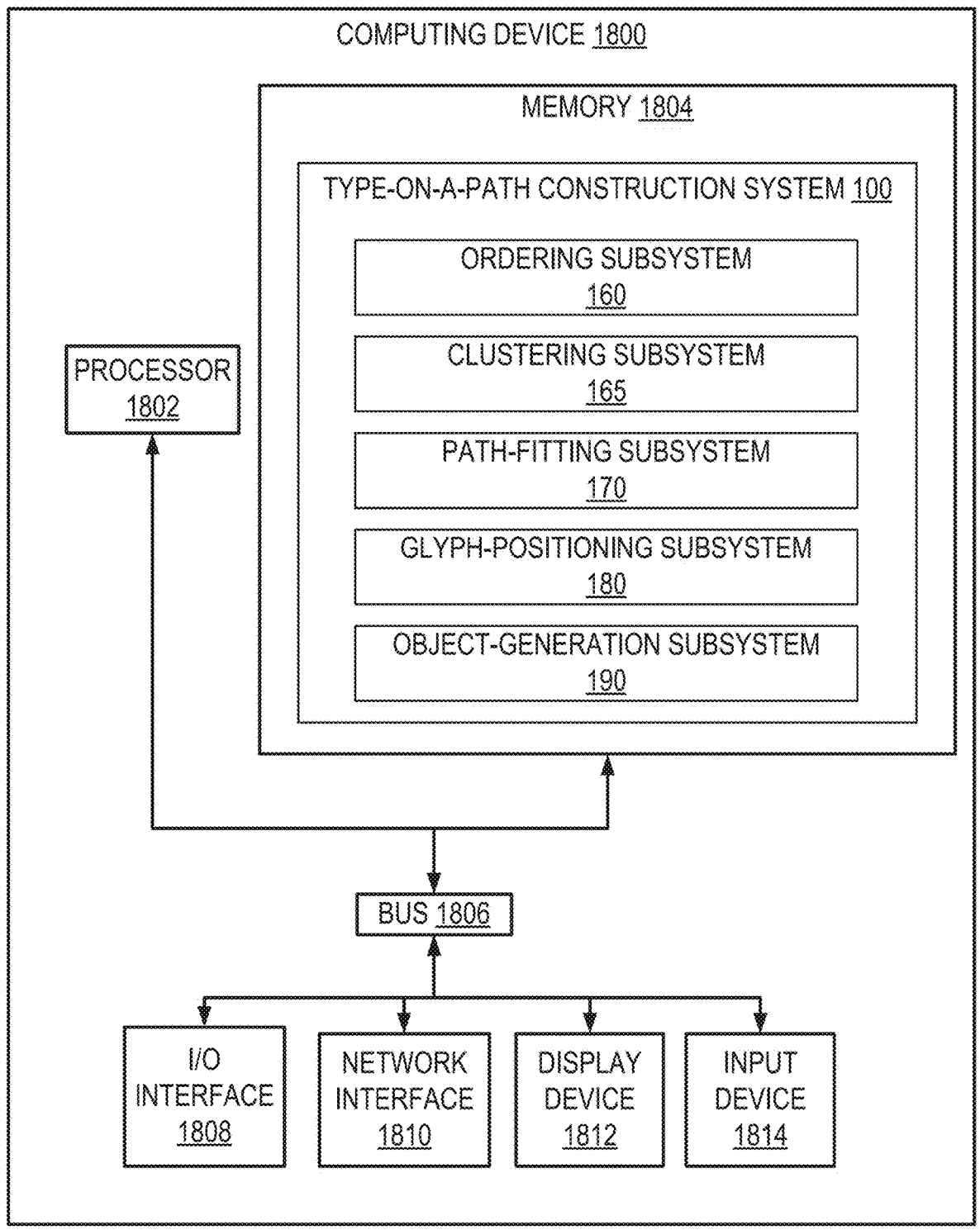
FIG. 18 shows an example of a computing system that performs certain operations of the TOP construction system, according to some embodiments described herein.

Any suitable computing system or group of computing systems can be used for performing the operations described herein. For example, FIG. 18 depicts an example of a computing device 1800 that executes the TOP construction system 100, including the ordering subsystem 160, the clustering subsystem 165, the path-fitting subsystem 170, and the glyph-positioning subsystem 180. The computing device 1800 depicted in FIG. 18 may be used to implement various systems, subsystems, and servers described in this disclosure. For instance, the computing device 1800 may act as the computing system 105 or the device 130 depicted in FIG. 1.

In FIG. 18, the depicted example of a computing device 1800 includes a processor 1802 communicatively coupled to one or more memory devices 1804. The processor 1802 executes computer-executable program code stored in a memory device 1804, accesses information stored in the memory device 1804, or both. Examples of the processor 1802 include a microprocessor, an application-specific integrated circuit (ASIC), a field-programmable gate array (FPGA), or any other suitable processing device. The processor 1802 can include any number of processing devices, including a single processing device.

The memory device 1804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, Read-Only Memory (ROM), Random-Access memory (RAM), an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, or ActionScript.

The computing device 1800 may also include a number of external or internal devices, such as input or output devices. For example, the computing device 1800 is shown with one or more input/output (I/O) interfaces 1808. An I/O interface 1808 can receive input from input devices (e.g., input device 1814) or provide output to output devices (e.g., display device 1812). One or more buses 1806 are also included in the computing device 1800. The bus 1806 communicatively couples components together in the computing device 1800.

The computing device 1800 executes program code that configures the processor 1802 to perform one or more of the operations described herein. The program code may correspond to the ordering subsystem 160, the clustering subsystem 165, the path-fitting subsystem 170, and the glyph-positioning subsystem 180, or other suitable applications that perform one or more operations described herein. The program code may be resident in the memory device 1804 or any suitable computer-readable medium and may be executed by the processor 1802 or any other suitable processor. In some embodiments, the ordering subsystem 160, the clustering subsystem 165, the path-fitting subsystem 170, and the glyph-positioning subsystem 180 are stored in the memory device 1804, as depicted in FIG. 18. In additional or alternative embodiments, one or more of the ordering subsystem 160, the clustering subsystem 165, the path-fitting subsystem 170, and the glyph-positioning subsystem 180 are accessible to the computing device 1800 but are stored in a different memory device of a different computing device. In additional or alternative embodiments, the program code described above is stored in one or more other memory devices accessible via a data network.

In some embodiments, one or more of the data sets, models, and functions utilizes by the TOP construction system 100 are stored in the same memory device (e.g., the memory device 1804). For example, the computing device 1800 could be the computing system 105 of FIG. 1 and could host the ordering subsystem 160, the clustering subsystem 165, the path-fitting subsystem 170, and the glyph-positioning subsystem 180. In additional or alternative embodiments, one or more of the programs, data sets, models, and functions described herein are stored in one or more other memory devices accessible via a data network. For instance, in some embodiments, the ordering subsystem 160 is executed locally, and one or more of the clustering subsystem 165, the path-fitting subsystem 170, and the glyph-positioning subsystem 180 are executed on a different computing device and access the order generated by the ordering subsystem 160 over the data network. The ordering subsystem 160, the clustering subsystem 165, the path-fitting subsystem 170, and the glyph-positioning subsystem 180 need not all be executed on the same computing device as one another.

The computing device 1800 also includes a network interface device 1810. The network interface device 1810 includes any device or group of devices suitable for establishing a wired or wireless data connection to one or more data networks. Non-limiting examples of the network interface device 1810 include an Ethernet network adapter, a modem, and the like. The computing device 1800 is able to communicate with one or more other computing devices via a data network using the network interface device 1810.

Figure 19:
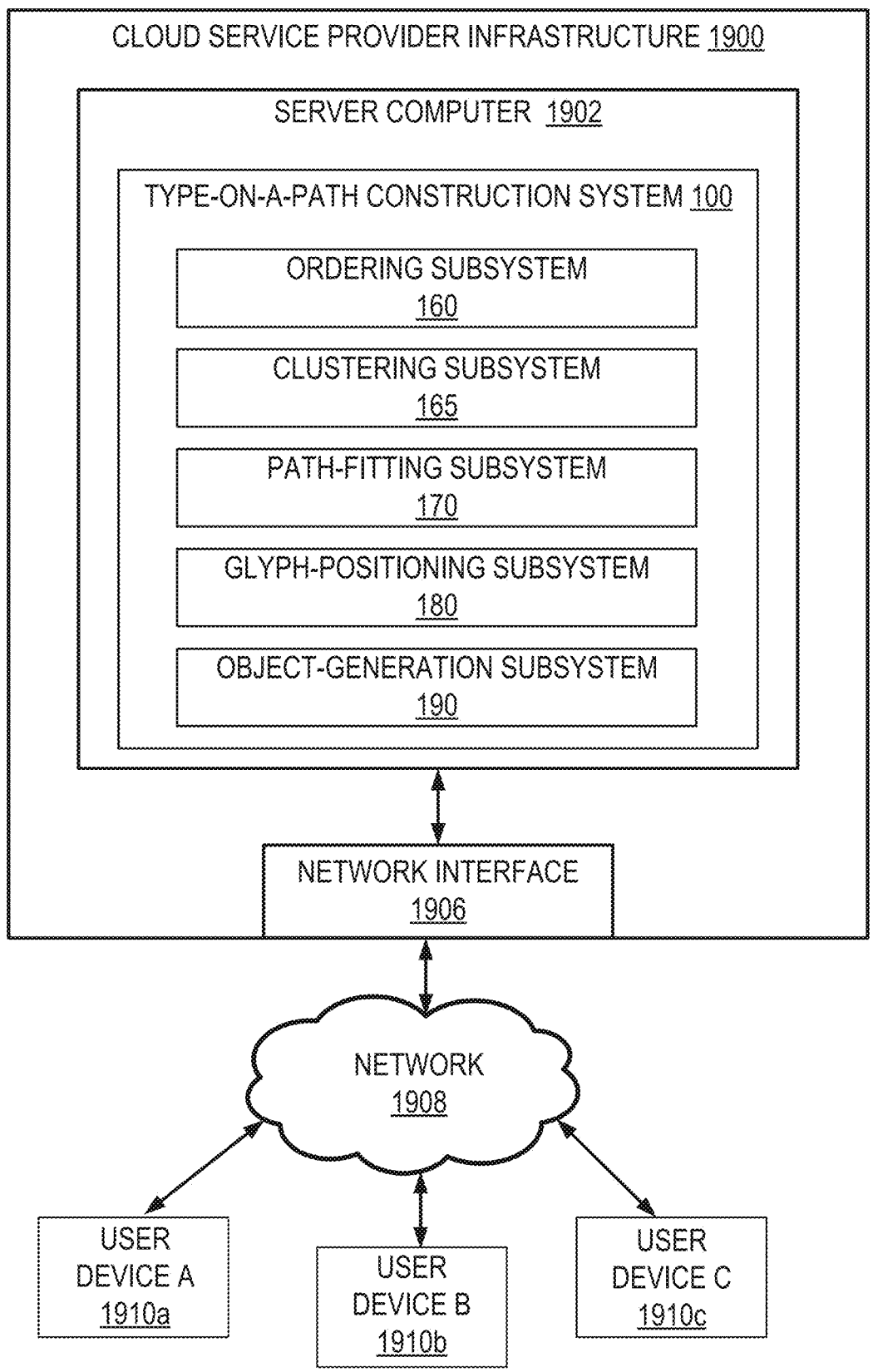
FIG. 19 shows an example of a cloud infrastructure offering a service for TOP construction, according to some embodiments described herein.

In some embodiments, the functionality provided by the computing device 1800 may be offered via a cloud-based service implemented as a cloud infrastructure 1900, also referred to as a cloud service provider infrastructure, provided by a cloud service provider. For example, FIG. 19 depicts an example of a cloud infrastructure 1900 offering one or more services including a service for TOP construction as described herein. The infrastructure may include one or more servers computers 1902 that implement such service, e.g., by running software or hardware. Such a service can be subscribed to and used by a number of user subscribers using user devices 1910a, 1910c, and 1910c (collectively 1910) across a network 1908. Each user device 1910 may act as the device 130 described herein, such that, in some embodiments, the TOP construction system 100 utilizes a device state of such a user device 1910. The service may be offered under a Software as a Service (SaaS) model, and one or more users may subscribe to such as service.

In the embodiment depicted in FIG. 19, the cloud infrastructure 1900 includes one or more server computers 1902 that are configured to perform processing to provide one or more services offered by the cloud service provider. One or more of server computers 1902 implement the ordering subsystem 160, the clustering subsystem 165, the path-fitting subsystem 170, and the glyph-positioning subsystem 180 that provide functionalities described herein. Additionally or alternatively, however, each user device 1910 executes its own ordering subsystem 160, the clustering subsystem 165, path-fitting subsystem 170, or glyph-positioning subsystem 180. For example, a server computer 1902 executes software to implement the services and functionalities provided by the ordering subsystem 160, the clustering subsystem 165, the path-fitting subsystem 170, and the glyph-positioning subsystem 180, where the software, when executed by one or more processors of the server computers 1902, causes provision of the services and functionalities described herein.

Program code or other instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, or ActionScript. In various examples, the server computers 1902 can include volatile memory, nonvolatile memory, or a combination thereof.

In the embodiment depicted in FIG. 19, the cloud infrastructure 1900 also includes a network interface device 1906 that enables communications to and from the cloud infrastructure 1900. In certain embodiments, the network interface device 1906 includes any device or group of devices suitable for establishing a wired or wireless data connection to the network 1908. Non-limiting examples of the network interface device 1906 include an Ethernet network adapter, a modem, or the like. The cloud infrastructure 1900 is able to communicate with the user devices 1910a, 1910b, and 1910c via the network 1908 using the network interface device 1906.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   receiving, by a processing device, a set of character glyphs in an arbitrary order in input data;
   determining, by the processing device, a logical order for the set of character glyphs by minimizing a total cost of ordered pairs of character glyphs based on orientations of individual character glyphs relative to one another according to the input data;
   generating, by the processing device, based on the logical order, a path for the set of character glyphs; and
   generating, by the processing device, a text object comprising the set of character glyphs arranged in the logical order along the path.

2. The method of claim 1, wherein determining the logical order for the set of character glyphs by minimizing a total cost of ordered pairs of character glyphs based on orientations of individual character glyphs relative to one another according to the input data comprises:
   computing respective costs for the ordered pairs of character glyphs in the set of character glyphs based on orientations of individual character glyphs relative to one another according to the input data; and
   determining the logical order for the set of character glyphs based on the respective costs of the ordered pairs of character glyphs.

3. The method of claim 2, wherein determining the logical order for the set of character glyphs based on the respective costs of the ordered pairs of character glyphs comprises:
   building an ordered list of the ordered pairs of character glyphs based on the respective costs of the ordered pairs; and
   determining the logical order for the set of character glyphs based on the ordered list of the ordered pairs of character glyphs.

4. The method of claim 2, wherein computing respective costs for ordered pairs of character glyphs comprises computing a cost for an ordered pair comprising a first character glyph and a second character glyph based on a difference in orientations of the first character glyph and the second character glyph.

5. The method of claim 2, further comprising:
   dividing received character glyphs into the set of character glyphs and an additional set of character glyphs;
   generating an additional path for the additional set of character glyphs; and
   combining the additional set of character glyphs into an additional text object comprising the additional set of character glyphs arranged in the logical order along the additional path.

6. The method of claim 1, wherein generating the path for the set of character glyphs comprises.
   determining anchor points comprising a respective anchor point of each character glyph in the set of character glyphs;
   fitting curves to connect the anchor points of the individual character glyphs in the set of character glyphs as arranged in the order; and
   determining the path as including the curves.

7. The method of claim 6, wherein fitting the curves to connect the anchor points of the individual character glyphs in the set of character glyphs comprises performing a binary search over control point candidates to identify control points of a curve connecting a first character glyph in the set of character glyphs to a second character glyph in the set of character glyphs.

8. The method of claim 1, further comprising adjusting a position on the path of a character glyph of the set of character glyphs.

9. The method of claim 8, wherein adjusting the position on the path of the character glyph comprises:
   adjusting kerning on the character glyph;
   determining an error between (a) an original distance between the character glyph and a previous character glyph in the logical order and (2) an updated distance between the character glyph with adjusted kerning and the previous character glyph; and
   adjusting the kerning an additional time based on the error.

10. A non-transitory computer-readable medium storing executable instructions, which when executed by a processing device, cause the processing device to perform operations comprising:
    receiving a set of character glyphs in an arbitrary order in input data;
    determining a logical order for the set of character glyphs by minimizing a total cost of ordered pairs of character glyphs based on orientations of individual character glyphs relative to one another according to the input data;
    generating based on the logical order, a path for the set of character glyphs; and
    generating a text object comprising the set of character glyphs arranged in the logical order along the path.

11. The non-transitory computer-readable medium of claim 10, wherein determining the logical order for the set of character glyphs by minimizing a total cost of ordered pairs of character glyphs based on orientations of individual character glyphs relative to one another according to the input data comprises:
    computing respective costs for the ordered pairs of character glyphs in the set of character glyphs;
    building an ordered list of the ordered pairs of character glyphs based on the respective costs of the ordered pairs; and determining the logical order for the set of character glyphs based on the ordered list of the ordered pairs of character glyphs.

12. The non-transitory computer-readable medium of claim 11, wherein computing respective costs for ordered pairs of character glyphs comprises computing a cost for an ordered pair comprising a first character glyph and a second character glyph based on a difference in orientations of the first character glyph and the second character glyph.

13. The non-transitory computer-readable medium of claim 10, the operations further comprising:
dividing received character glyphs into the set of character glyphs and an additional set of character glyphs;
generating an additional path for the additional set of character glyphs; and
combining the additional set of character glyphs into an additional text object comprising the additional set of character glyphs arranged in the logical order along the additional path.

14. The non-transitory computer-readable medium of claim 10, wherein generating the path for the set of character glyphs comprises:
determining anchor points comprising a respective anchor point of each character glyph in the set of character glyphs;
fitting curves to connect the anchor points of the individual character glyphs in the set of character glyphs as arranged in the order; and
determining the path as including the curves.

15. The non-transitory computer-readable medium of claim 10, further comprising adjusting a position on the path of a character glyph of the set of character glyphs.

16. A system comprising:
a memory component; and
a processing device coupled to the memory component, the processing device to perform operations comprising:
receiving a set of character glyphs in an arbitrary order in input data;
determining a logical order for the set of character glyphs by minimizing a total cost of ordered pairs of character glyphs based on orientations of individual character glyphs relative to one another according to the input data;
generating based on the logical order, a path for the set of character glyphs; and
generating a text object comprising the set of character glyphs arranged in the logical order along the path.

17. The system of claim 16, wherein determining the logical order for the set of character glyphs by minimizing a total cost of ordered pairs of character glyphs based on orientations of individual character glyphs relative to one another according to the input data comprises:
computing respective costs for the ordered pairs of character glyphs in the set of character glyphs;
building an ordered list of the ordered pairs of character glyphs based on the respective costs of the ordered pairs; and
determining the logical order for the set of character glyphs based on the ordered list of the ordered pairs of character glyphs.

18. The system of claim 17, wherein computing respective costs for ordered pairs of character glyphs comprises computing a cost for an ordered pair comprising a first character glyph and a second character glyph based on a difference in orientations of the first character glyph and the second character glyph.

19. The system of claim 16, the operations further comprising:
dividing received character glyphs into the set of character glyphs and an additional set of character glyphs;
generating an additional path for the additional set of character glyphs; and
combining the additional set of character glyphs into an additional text object comprising the additional set of character glyphs arranged in the logical order along the additional path.

20. The system of claim 16, wherein generating the path for the set of character glyphs comprises:
determining anchor points comprising a respective anchor point of each character glyph in the set of character glyphs;
fitting curves to connect the anchor points of the individual character glyphs in the set of character glyphs as arranged in the order; and
determining the path as including the curves.

* * * * *